(12) United States Patent
Yamamura et al.

(10) Patent No.: US 9,442,836 B2
(45) Date of Patent: Sep. 13, 2016

(54) ARITHMETIC PROCESSING DEVICE, INFORMATION PROCESSING DEVICE, CONTROL METHOD FOR INFORMATION PROCESSING DEVICE, AND CONTROL PROGRAM FOR INFORMATION PROCESSING DEVICE

(71) Applicant: FUJITSU LIMITED, Kawasaki-shi, Kanagawa (JP)

(72) Inventors: Shuji Yamamura, Yokohama (JP); Masaharu Maruyama, Kawasaki (JP); Toshio Yoshida, Tokorozawa (JP); Ryuji Kan, Yokohama (JP); Naohiro Kiyota, Yokohama (JP); Mikio Hondo, Kawasaki (JP); Tsuyoshi Motokurumada, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 14/464,808

(22) Filed: Aug. 21, 2014

(65) Prior Publication Data

US 2015/0089180 A1 Mar. 26, 2015

(30) Foreign Application Priority Data

Sep. 20, 2013 (JP) ................................. 2013-195183

(51) Int. Cl.
*G06F 12/00* (2006.01)
*G06F 12/02* (2006.01)
(Continued)

(52) U.S. Cl.
CPC ......... *G06F 12/023* (2013.01); *G06F 9/30043* (2013.01); *G06F 12/10* (2013.01); *G06F 12/1441* (2013.01); *G06F 12/1483* (2013.01)

(58) Field of Classification Search
CPC ... G06F 12/00; G06F 12/0646; G06F 3/0629
USPC .......................................... 711/100, 154, 170
See application file for complete search history.

(56) References Cited

U.S. PATENT DOCUMENTS 5,848,435 A * 12/1998 Brant ...................... G06F 11/08
711/152
5,963,984 A * 10/1999 Garibay, Jr. ........ G06F 12/1027
711/202
(Continued)

FOREIGN PATENT DOCUMENTS

| EP | 1132801 A2 | 9/2001 |
| JP | 57-6952 | 1/1982 |
| JP | 58-205995 | 12/1983 |

OTHER PUBLICATIONS

Jonathan B. Rosenberg, "How Debuggers Work", pp. 77-79, 87-90 and 126 (23 pages), ASCII Corporation, 1st edition, Apr. 1998 (partial translation).

(Continued)

*Primary Examiner* — Tuan Thai
(74) *Attorney, Agent, or Firm* — Fujitsu Patent Center

(57) ABSTRACT

An arithmetic processing device having an allocation unit configured to reserve a memory allocation area in a memory and register address range information indicating an address range of the memory allocation area in an address range table, in response to an execution of a memory area allocation function requesting memory area allocation, and a determination unit configured to refer to the address range table and perform determination processing as to whether or not an access destination address of a memory access instruction is within an address range indicated by the address range information registered in the address range table, in response to an execution of the memory access instruction relating to the memory allocation area.

9 Claims, 19 Drawing Sheets

(51) Int. Cl.
*G06F 12/14* (2006.01)
*G06F 12/10* (2016.01)
*G06F 9/30* (2006.01)

(56) References Cited

U.S. PATENT DOCUMENTS

| | | | |
|---|---|---|---|
| 7,543,132 B1* | 6/2009 | Grohoski | G06F 12/1027 |
| | | | 711/150 |
| 2002/0178340 A1 | 11/2002 | Collins et al. | |
| 2006/0294288 A1* | 12/2006 | Seth | G06F 12/145 |
| | | | 711/6 |
| 2007/0174498 A1 | 7/2007 | Noh | |
| 2009/0113141 A1* | 4/2009 | Bullman | G06F 12/1483 |
| | | | 711/147 |
| 2010/0161928 A1 | 6/2010 | Sela et al. | |
| 2011/0173411 A1 | 7/2011 | Chen et al. | |
| 2013/0013843 A1 | 1/2013 | Radovic et al. | |

OTHER PUBLICATIONS

Extended European Search Report dated Jan. 29, 2015 for corresponding European Patent Application No. 14181728.8, 10 pages.

* cited by examiner

FIG. 8

VA RANGE TABLE
                                          ⌐ 34

| ID | START ADDRESS      | RANGE  |
|----|--------------------|--------|
| 1  | 0x1000000009335010 | 0x40   |
| 2  | 0x200000001e757010 | 0x10   |
| 3  | 0x300000001dc65010 | 0x1    |
| 4  | 0x4000000002605010 | 0x400  |
|    |                    |        |

VA RANGE REGISTER

| ID | START ADDRESS      | RANGE |
|----|--------------------|-------|
| 2  | 0x200000001e757010 | 0x10  |

⌐ 35

ARITHMETIC PROCESSING DEVICE, INFORMATION PROCESSING DEVICE, CONTROL METHOD FOR INFORMATION PROCESSING DEVICE, AND CONTROL PROGRAM FOR INFORMATION PROCESSING DEVICE

CROSS-REFERENCE TO RELATED APPLICATION

This application is based upon and claims the benefit of priority of the prior Japanese Patent Application No. 2013-195183, filed on Sep. 20, 2013, the entire contents of which are incorporated herein by reference.

FIELD

The present invention relates to an arithmetic processing device, an information processing device, a control method for an information processing device, and a control program for an information processing device.

BACKGROUND

A processor, which is an arithmetic processing device, fetches, decodes, and executes instruction codes of software. Software instructions include a memory access instruction relating to memory access, such as a load instruction and a store instruction. Meanwhile, a certain memory area is reserved by executing a memory area allocation function. When a memory access instruction relating to the memory area which has thus been reserved is executed, the presence of bugs or erroneous codes in a program results in memory corruption in which data in a memory outside the intended memory area are overwritten on unintended data. Alternatively, a failure occurs when the data in the memory outside the intended memory area are loaded.

Related arts are US Patent 2013/0013843, Japanese Issued Patent H01-33857, H03-68421 and "How Debuggers Work, Algorithms, Data Structures, and Architecture", Jonathan B. Rosenberg.

SUMMARY

In order to prevent such memory corruption, it is necessary to detect and correct the bugs and erroneous codes of the program, and when the detection is implemented on a huge program, a large number of steps are required therefor. Further, the bugs and erroneous codes are difficult to detect without affecting the execution performance of the program.

One aspect of the embodiment is an arithmetic processing device comprising:
an allocation unit configured to reserve a memory allocation area in a memory and register address range information indicating an address range of the memory allocation area in an address range table, in response to an execution of a memory area allocation function requesting memory area allocation; and
a determination unit configured to refer to the address range table and perform determination processing as to whether or not an access destination address of a memory access instruction is within an address range indicated by the address range information registered in the address range table, in response to an execution of the memory access instruction relating to the memory allocation area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of the address range table and address range register.

DESCRIPTION OF EMBODIMENTS

Figure 1:
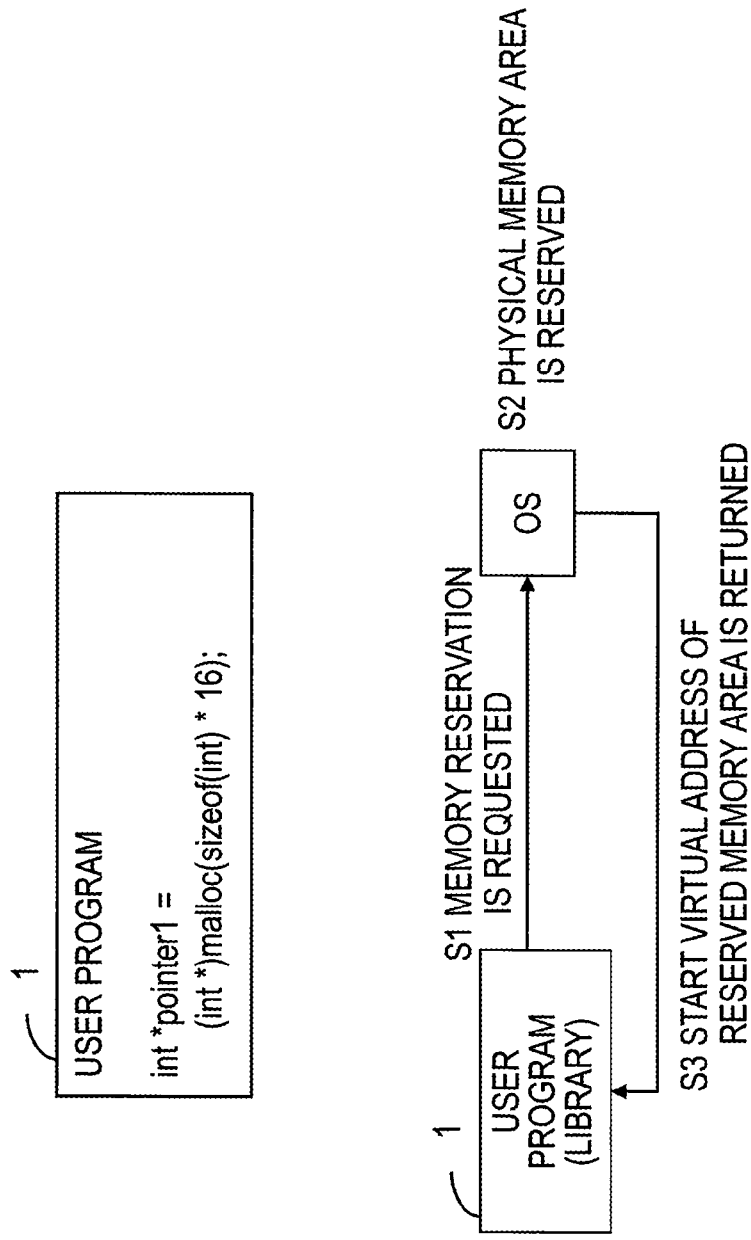
FIG. 1 illustrates an example of a user program and the operation of OS when a memory area is requested to be reserved.

FIG. 1 illustrates an example of a user program and the operation of OS when a memory area is requested to be reserved. A user program 1 requests OS to reserve (or allocate) a memory area having 16 areas of a size "sizeof (int)" by a memory area allocation function malloc (S1). In response to the request, the OS reserves a physical memory area (S2) and returns a virtual address of the start of the reserved memory area as an address pointer pointer1 (S3). As a result, a memory area with the address pointer pointer1 as a virtual address of the start is allocated in the memory area.

Figure 2:
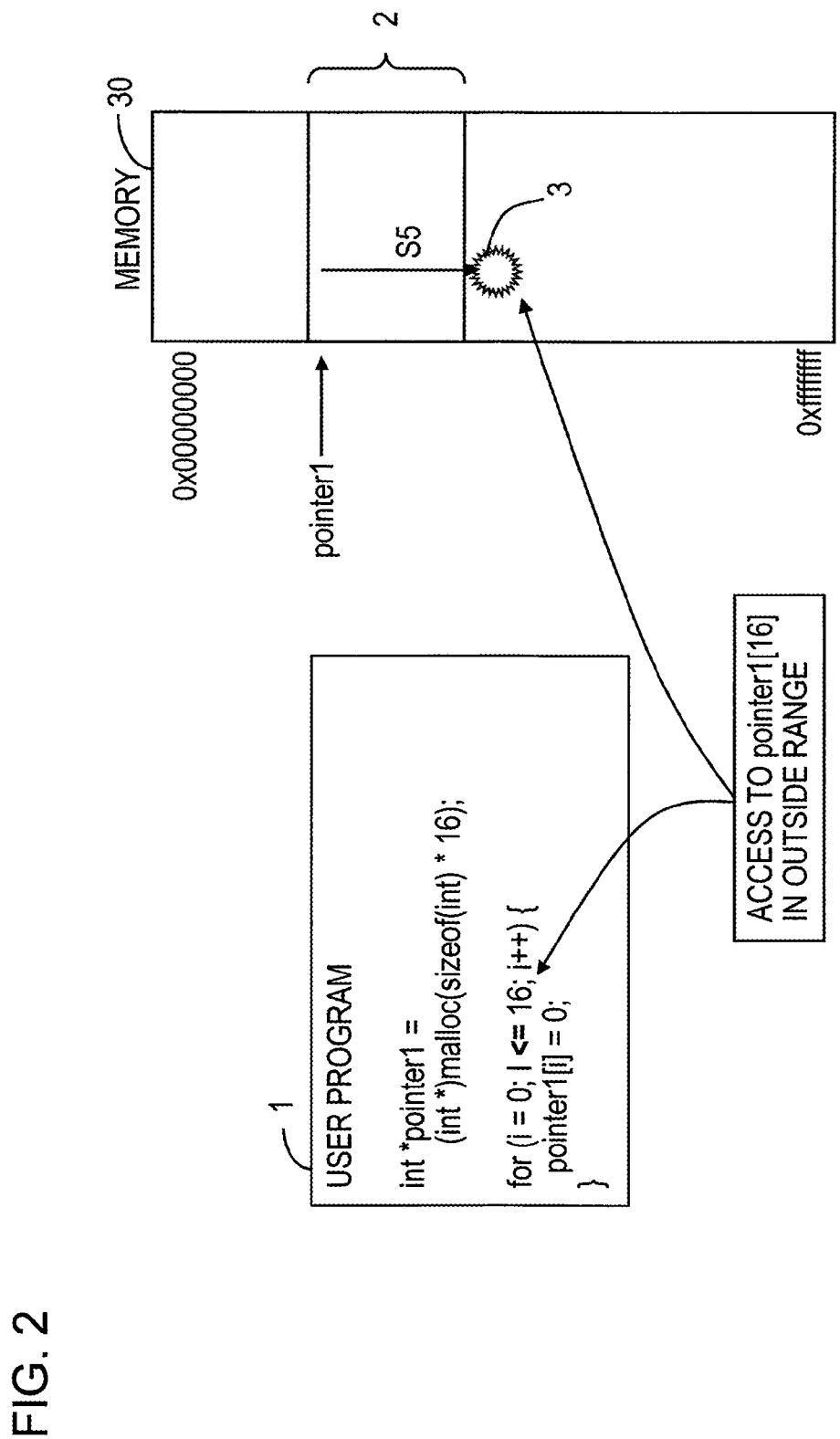
FIG. 2 illustrates a first example of memory corruption.

FIG. 2 illustrates a first example of memory corruption. The user program 1 that generates the memory corruption and a memory 30 are shown in FIG. 2. In the user program 1, the memory area allocation function malloc same as that in FIG. 1 is shown, and a memory area 2 having 16 areas with a size "sizeof(int)" having the address of the address pointer pointer1 as the start address is allocated and reserved in the memory by this function.

The FOR statement in the user program 1 describes writing the numerical value "0" into the memory area with an address pointer1 [i] from i=0 to i=16. As a result, the numerical value "0" is written into the pointer1[16] outside the range of the allocated memory area 2 by the execution of the FOR statement, and data of the area 3 are corrupted.

Figure 3:
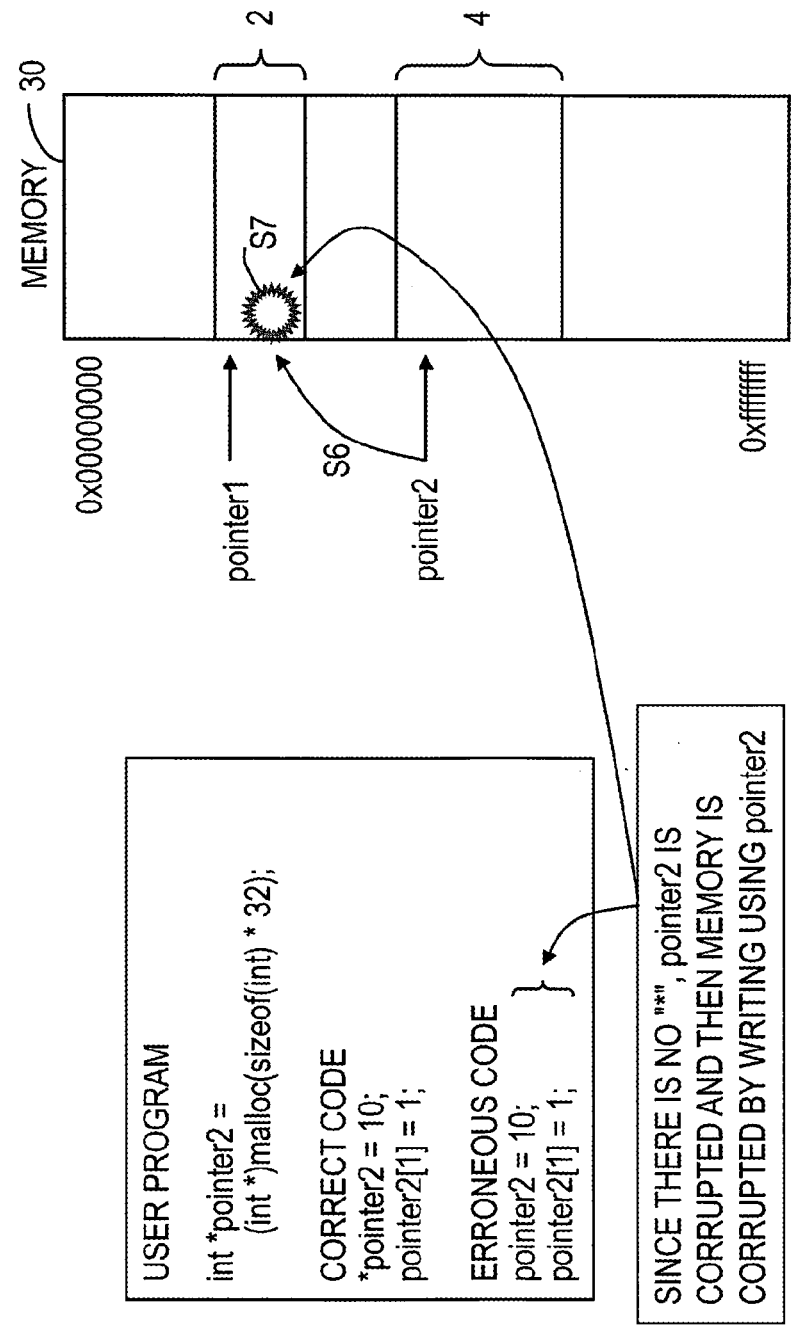
FIG. 3 illustrates the second example of memory corruption.

FIG. 3 illustrates the second example of memory corruption. The user program that generates the memory corruption and the memory are shown in FIG. 3. The memory area allocation function malloc, the correct code following the function
*pointer2=10;
pointer2[1]=1;
and the erroneous code
pointer2=10;
pointer2[1]=1;
are shown in the user program.

The memory area allocation function malloc causes the OS to execute the operation same as that shown in FIG. 1, a memory area 4 is reserved in the memory, and the virtual address of the start thereof is returned as an address pointer pointer2. Meanwhile, the correct code is an instruction to write the numerical value "10" into a memory area corresponding to the address of the address pointer pointer2 and to write the numerical value "1" in the memory area with the address subsequent to the aforementioned address.

By contrast, in the erroneous code, the numerical value "10" is written to the address pointer pointer2. Therefore, the virtual address of the start returned from the OS is by itself changed (S6). Further, in the code of pointer2[1]=1 subsequent thereto, the numerical value "1" is written into the memory area 2, which is different from the memory area 4 (S7). As a result, memory corruption in which data of the memory area 2 are corrupted is generated.

In addition to the case in which data are written into the memory area, as with a store instruction, in the case in which data are read from the memory area, as with a load instruction, the reading of data outside the allocated memory region also leads to a bug and can be considered as one type of memory corruption.

A method for detecting the occurrence of memory corruption, for example, includes generating a trap during the execution of load and store instructions, which are memory access instructions, and having a debugger check in response to the trap whether or not the address, which is to be accessed by the load and store instructions, is within an address range of the memory area that has heretofore been reserved. However, since the traps are generated in all load and store instructions, the overhead is extremely large.

In another method for detecting the occurrence of memory corruption, ID information is stored in a memory area reserved on a memory, and it is determined whether or not the memory area with incorrect ID information is attempted to be accessed by referring to the ID information in the reserved memory area when each execution of a memory access instruction. However, in this case, an area for storing the ID information should be reserved in the memory area, the size of the memory area which is to be reserved increases, the ID information should be written into all of the memory areas reserved each time the memory area is reserved, and the performance overhead becomes extremely large.

[Present Embodiment]

Figure 4:
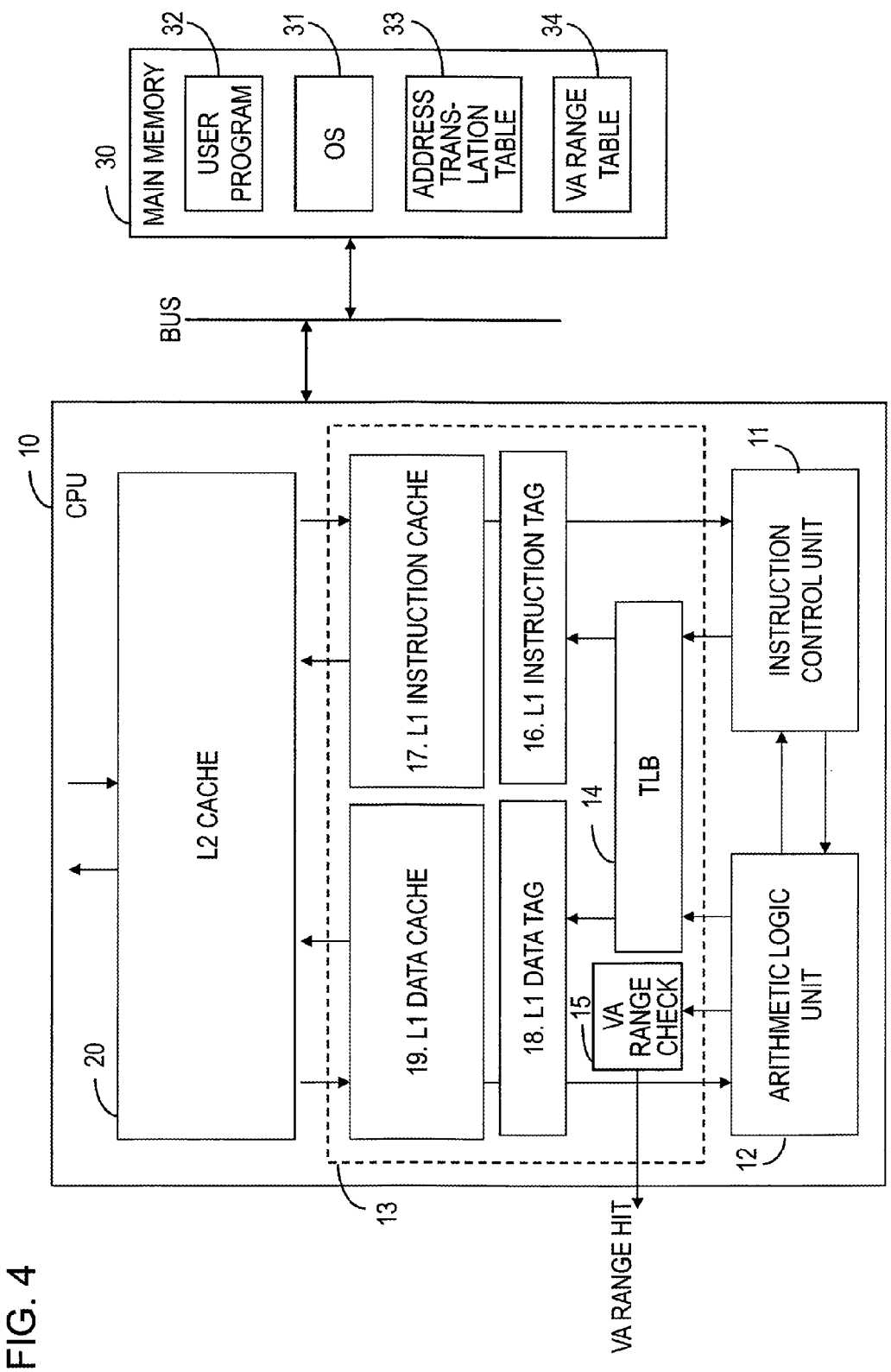
FIG. 4 illustrates an information processing device including a processor as an arithmetic processing unit and a memory as a main storage device in the present embodiment.

FIG. 4 illustrates an information processing device including a processor as an arithmetic processing unit and a memory as a main storage device in the present embodiment. A central processing unit (CPU) 10 as the arithmetic processing unit and a main memory 30 are connected by a bus BUS. The CPU 10, which is a processor, has an instruction control unit 11 that performs the instruction fetch and decoding, an arithmetic logic unit 12 that performs computations corresponding to the decoding result, a primary (L1) cache control unit 13, and a secondary (L2) cache control unit 20. The primary cache control unit 13 has a translation look aside buffer (TLB) unit 14 that translates the virtual address of a memory into a physical address, a L1 instruction tag 16, a L1 instruction cache 17, a L1 data tag 18, and a L1 data cache 19.

Further, the primary cache control unit 13 also has an address range check unit (determination unit) 15 that performs the address range check as to whether the access destination address of a memory access instruction, such as load and store instructions, is within the address range of the memory allocation area that has been allocated by the memory area allocation function. When the access destination address is outside the address range of the memory allocation area, it is determined that the instruction is a memory access instruction that will cause memory corruption. The address range check unit 15 is provided in parallel with the TLB unit 14, which performs the address translation, and executes the address range check at a stage same as the pipeline stage of address translation.

An OS 31 and a user program 32 are deployed in the main memory 30. The main memory 30 also stores an address translation table 33 storing the correspondence relationship of virtual addresses of memory access instructions and physical addresses, and an address range table 34 storing the address range information on the memory allocation areas allocated by the memory area allocation function.

Some elements of the address translation table 33 are temporarily cached in the TLB in the TLB unit 14 in the primary cache control unit 13. In the address translation processing, the TLB is initially referred to, and where there is a hit, the translated physical address is outputted. Where there is no hit, the address translation table 33 in the main memory 30 is referred to for the translation to the physical address.

Likewise, in the present embodiment, the address range information on some elements of the address range table 34 is temporarily cached in an address range register in the address range check unit 15 in the primary cache control unit 13. The address range check unit 15 initially refers to the address range register in the primary cache control unit 13 and determines whether or not the access destination address of the memory access instruction is within the address range of the memory allocation area. Where the access destination address is not in any of the address ranges of the address range information of the address range register, it is determined whether it is in any of the address ranges of the address range information of other elements of the address range table 34 in the main memory 30. This determination may be performed by the OS, or other elements in the address range table 34 may be read from the main memory 30 and registered in the address range register in the primary cache control unit 13 and the determination may be again performed by the address range check unit 15.

The memory area allocation processing, address range table, address range register, and address range check unit are explained below.

Figure 5:
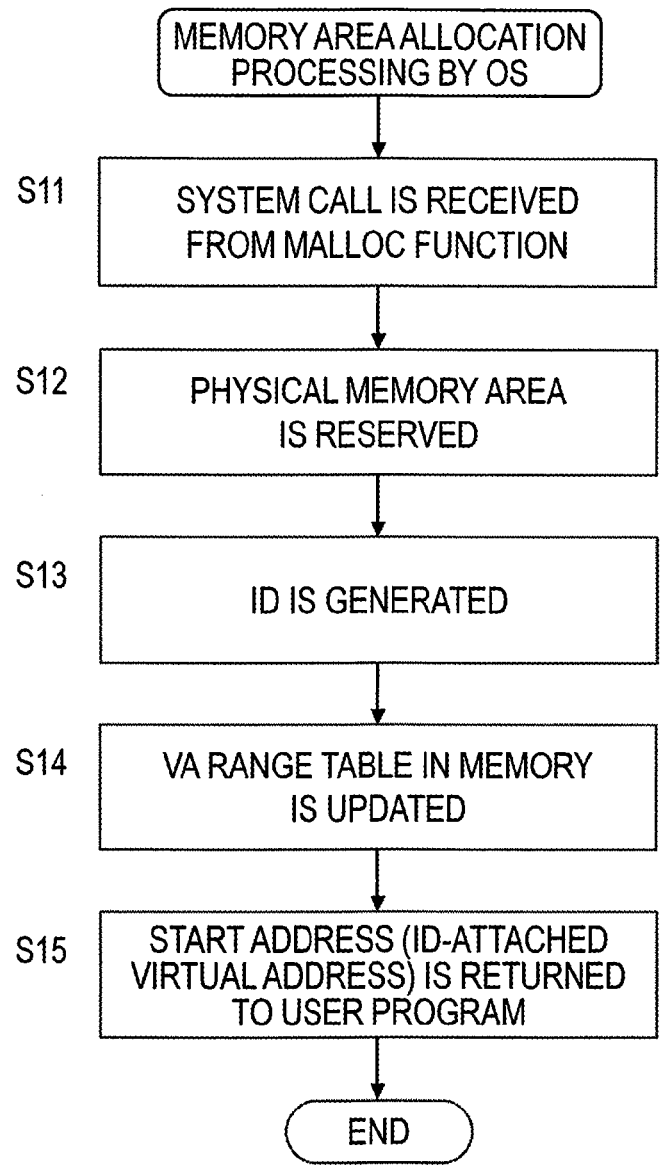
FIG. 5 is a flowchart showing the address area allocation processing in the present embodiment.

FIG. 5 is a flowchart showing the address area allocation processing in the present embodiment. As shown in FIG. 1, where the memory area allocation function malloc in the user program is executed, the OS executes the memory area allocation processing in the below-described manner.

As shown in FIG. 5, the OS initially receives a system call from the malloc function (S11). In response to the system call, the OS reserves the memory area designated by the malloc function in the physical memory such as the main memory 30 (S12). When the memory area is reserved, the OS generates, for example, a start address and the allocated memory size as address range information indicating the address range of the memory allocation area. The start address is a virtual address. The OS then generates management area identification information ID that identifies the memory area allocated by the memory area allocation function malloc (S13). The management area identification information ID is the information identifying the memory allocation area, which is the object of managing the memory corruption, and the generation thereof is performed, for example, by generating and allocating random numerical values.

Then, the OS stores the management area identification information ID, start address, and memory size as the address range information on the reserved memory allocation area in the address range table 34 in the main memory 30. The OS then returns the management area identification information ID and start address to the user program. As a result, the user program acquires the management area identification information ID, which identifies the memory allocation request, and the start address that identifies the memory allocation area reserved by the memory allocation request.

Figure 6:
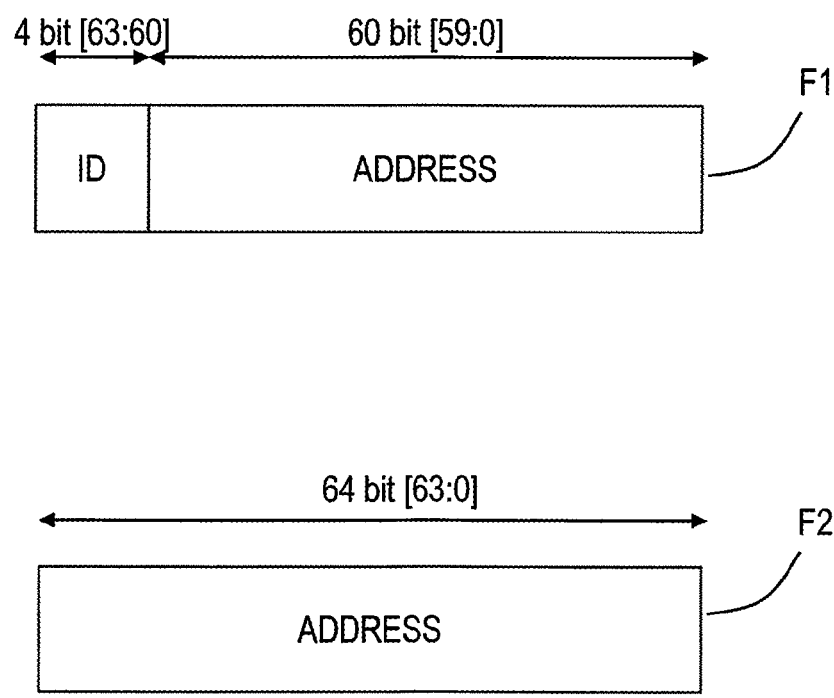
FIG. 6 illustrates the format of the start address returned by the OS to the user program with respect to the system call produced by the memory area allocation function.

FIG. 6 illustrates the format of the start address returned by the OS to the user program with respect to the system call produced by the memory area allocation function. FIG. 6 illustrates an address format F1 relating to the case in which the address range check for memory corruption detection is enabled and an address format F2 relating to the case in which the check is disabled.

When the address range check mechanism is enabled, the management area identification information ID is embedded, for example, in the most significant 4 bits [63:60], for example, in the 64-bit address [63:0], as shown in the format F1. In other words, the OS embeds the 4-bit management area identification information ID in the most significant 4 bits [63:60] of the start address [63:0] and returns the information to the user program.

Meanwhile, where the memory range check mechanism is disabled, the OS returns the 64-bit start address with respect to the system call produced by the memory area allocation function, as shown in the format F2. Therefore, all 64 bits including the most significant 4 bits become the address information.

Where the address range check is thus enabled, the OS returns the management area identification information ID to the user program by using the bits of part of the 64-bit start address, thereby making it unnecessary to change the conventional circuit configuration. Further, the address information of the most significant 4 bits of the start address is lost, but performing also the comparison of the management area identification information ID in the address range check causes no failure in the address range check. However, it is necessary that the address range of the memory allocation area could be specified by 60 bits [59:0].

Further, in the address translation unit, the 4-bit management area identification information ID to be used for address range check in the virtual address should be excluded from the tag comparison objects. This is explained below in greater detail.

Figure 7:
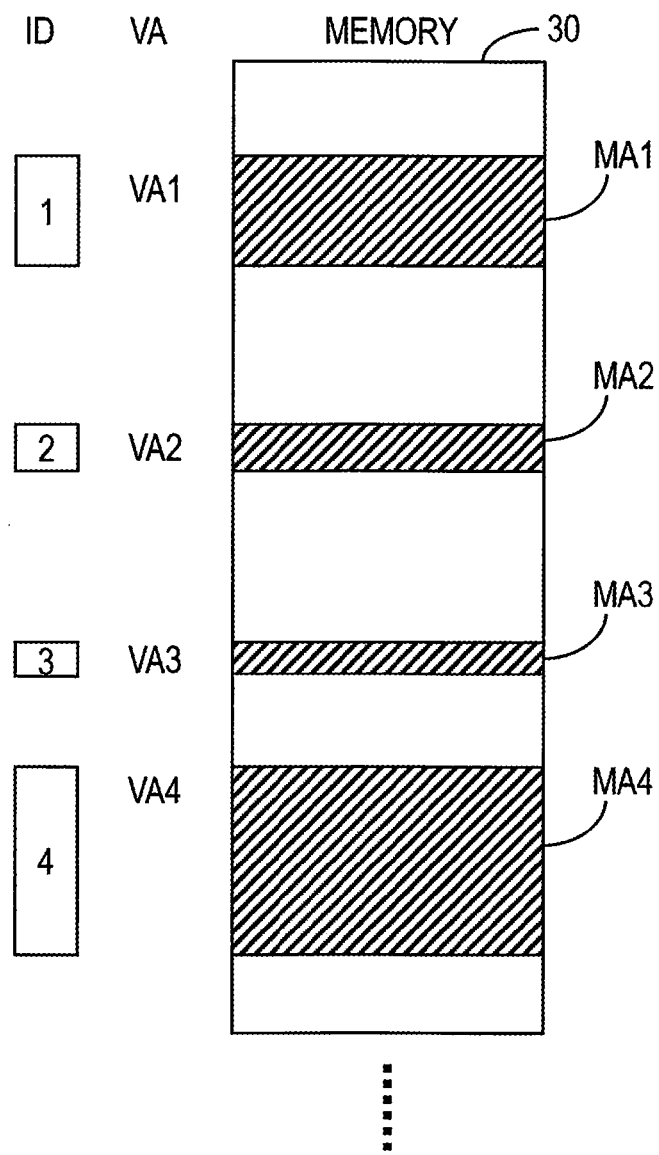
FIG. 7 illustrates an example of the memory allocation area of the memory and the respective management area identification information and start address.

FIG. 7 illustrates an example of the memory allocation area of the memory and the respective management area identification information and start address. In the example shown in FIG. 7, four memory allocation areas MA1 to MA4 are reserved, for example, in a heap area in the memory 30. The management area identification information ID=1 to 4, which identifies the memory allocation areas MA1 to MA4, respectively, and the start addresses VA1 to VA4 of the respective memory allocation areas are returned by the OS to the user program.

In some cases, some of the memory allocation area reserved by the memory area allocation function is not necessarily a memory corruption detection object. In such cases, the OS may issue, as the management area identification information ID, ID=0 indicating that the area is not a memory corruption detection object. Further, when the management area identification information ID is ID=0, the OS does not store the address range information on the memory allocation area in the address range table. Instead, when the memory access instruction holds ID=0, the address range check unit 15 omits the address range check performed with reference to the address range table, and outputs a determination result indicating that the address is not outside the address range. This will be explained below in greater detail.

FIG. 8 illustrates an example of the address range table and address range register. The address range table 34 stores the management area identification information ID (4 bits), the start address [63:0], and the size (range) [7:0] correspondingly to each memory allocation area. The start address is a 64-bit virtual address (VA); for example, the management area identification information ID is embedded in the 4 most significant bits [63:60].

The address range register 35 stores one element of the address range table 34. However, in the below-described embodiment, a plurality of address range registers is provided in the address range check unit 15, and the address range check is performed in parallel for a plurality of address allocation areas.

The address range register 35 is referred to when the address range check unit 15 determines whether or not the access destination address of the memory access instruction is within the address range of the memory allocation area. Therefore, the address range information may be stored in the address range register 35. For example, the management area identification information ID, start address, and final address may be stored instead of the management area identification information ID, start address, and size, such as shown in FIG. 8. Further, the address range register 35 also stores, as described hereinbelow, an enable flag indicating whether or not the register value is enabled.

The start address of the abovementioned address range table and address range register may be a 60-bit virtual address [59:0], from which the management area identification information ID has been removed, or a 64-bit virtual address [63:0], in which [0000] has been replaced with the 4-bit management area identification information ID, instead of the virtual address having embedded therein the management area identification information ID returned by the OS in response to the execution of the memory area allocation function.

Further, when a context switch is generated following a process switch, the operating system (OS) saves in a memory the contents of the address range register before the processor context switch, and the operating system also recovers the contents of the address range register after the processor context switch from the memory and switches the address range table reserved for each context, thereby making it possible to use the address range check mechanism of the present embodiment even in a multiprocess environment.

Figure 9:
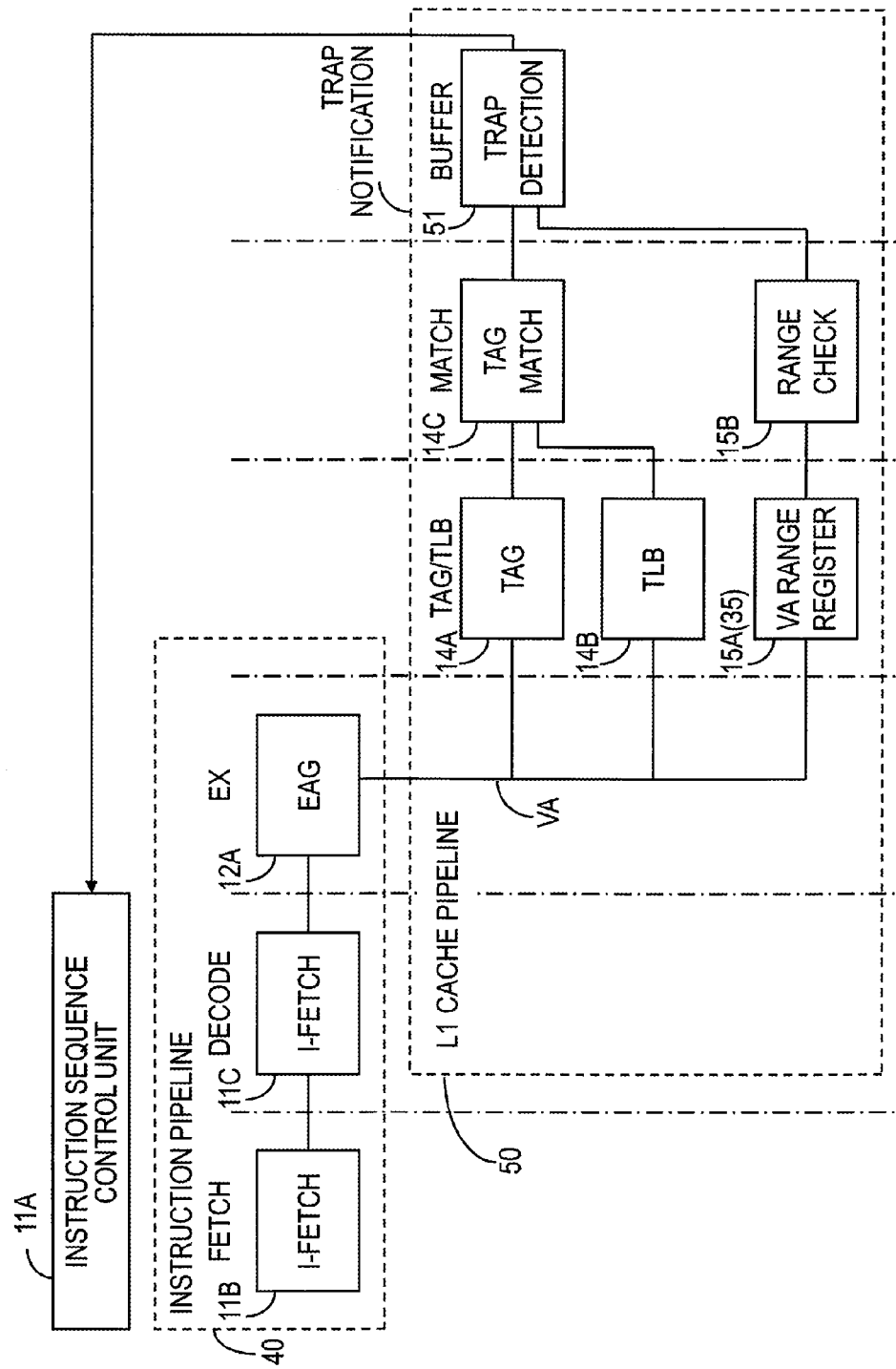
FIG. 9 is a configuration diagram of the processor (CPU) in the present embodiment.

FIG. 9 is a configuration diagram of the processor (CPU) in the present embodiment. This configuration diagram is explained in comparison with the configuration diagram shown in FIG. 4. FIG. 9 illustrates the configuration of part of the CPU 10. Thus, an instruction sequence control unit 11A that controls an instruction execution end or execution order, an instruction pipeline 40, and a primary cache pipeline 50 are shown in the figure. Vertical dash-dot lines in the figure show the boundaries of the pipeline stage.

The instruction pipeline 40 has an instruction fetch circuit 11B, a decoder 11C that decodes the instruction, and an effective address generator (EAG) 12A. The instruction sequence control unit 11A, instruction fetch circuit 11B, and decoder 11C correspond to the configuration of part of the instruction control unit 11 shown in FIG. 4. The effective address generator 12A corresponds also to the configuration of part of the arithmetic logic unit 12 shown in FIG. 4.

Meanwhile, the primary cache pipeline 50 corresponds to the configuration of part of the primary cache control unit 13 shown in FIG. 3. The primary cache pipeline 50 includes tagged TLB 14A, 14B constituting an address translation unit that performs the translation to a physical address from the virtual address VA generated by the effective address generator 12A, and a tag comparator 14C that detects the matching of tag values. The tagged TLB 14A, 14B and the tag comparator 14C correspond to the TLB unit 14 shown in FIG. 4. The TLB unit 14 translates the virtual address generated by the effective address generator 12A into the physical address. The tag comparator 14C outputs the physical address when there is a tag hit and outputs a tag mishit to the trap detector 51 when there is a tag miss. In the example shown in FIG. 9, the TLB unit 14 is constituted by two pipeline stages.

The primary cache pipeline 50 has an address range register 15A (35 in FIG. 8) and a range check circuit 15B that are referred to with respect to the virtual address VA generated by the effective address generator 12A. Those address range register 15A and range check circuit 15B correspond to the address range check unit 15 in FIG. 4. The range check circuit 15B outputs a range hit to the trap detector 51 when the virtual address VA matches the interior of the address range in the address range register 15A, and outputs a range mishit when there is no match.

Where the trap detector 51 receives the tag mishit from the tag comparator 14C and a range mishit from the range check circuit 15B, the trap detector outputs, as appropriate, a trap notification corresponding thereto to the instruction sequence control unit 11A. In response to the trap notification, the instruction sequence control unit 11A invokes the trap handler of the OS and executes the processing corresponding to the respective trap.

Figure 10:
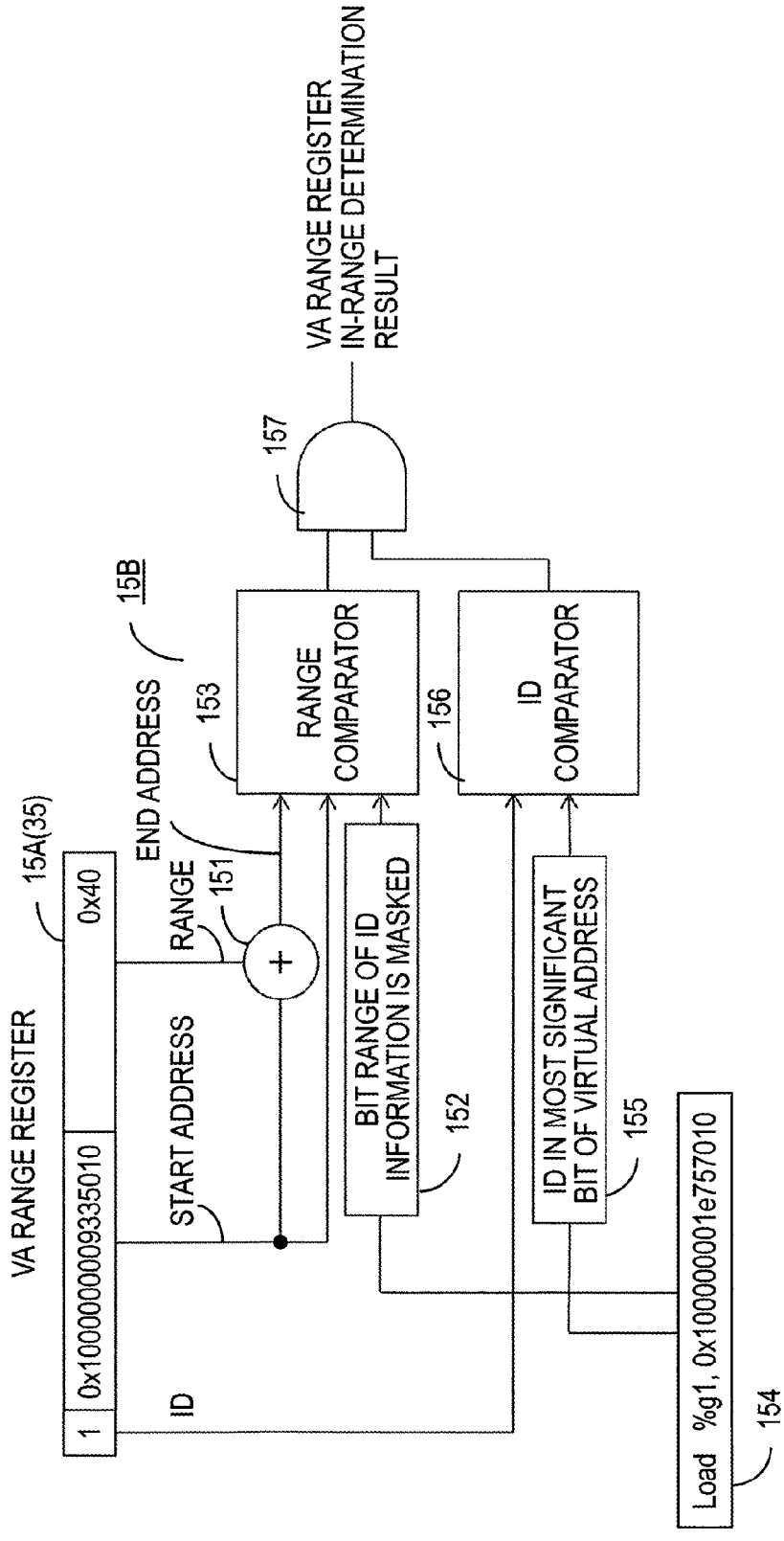
FIG. 10 is a schematic configuration diagram of the address range check unit.

FIG. 10 is a schematic configuration diagram of the address range check unit. In FIG. 10, it is checked whether or not the virtual address of a load instruction 154, as an example of memory access instruction, is within the address range of the address range information in the address range register 15A. The load instruction 154 is an instruction to read the data in the memory corresponding to the virtual address (in this example, "0x100000001e757010") in the operand and store the data in a register g 1.

The address range check unit 15 has an address range register 15A (35) and an adder 151 that generates an end address by adding up the start address [59:0] and the size (range) in the register 15A. The address range check unit 15 also has a circuit 152 that extracts the lower 60-bit virtual address [59:0] by masking the upper 4 bits (the most significant 1 bit of hexadecimal number system) of the virtual address of the load instruction 154, and a circuit 155 that extracts the most significant 4 bits [63:60] of the virtual address of the load instruction 154.

In the address range check unit, a range comparator 153 determines whether or not the virtual address [59:0] of the load instruction 154 is within the address range from the start address [59:0] indicated by the address range register 15A to the end address [59:0], and an ID comparator 156 determines whether or not the management area identification information ID [63:60] of the load instruction 154 matches the management area identification information ID [3:0] of the address range register 15A. An AND gate 157 outputs, as a determination result, an address range hit indicating that the virtual address is within the address range when matching is determined in both comparators 153, 154, or an address range mishit indicating that the virtual address is outside the address range when a mismatch is determined in either of the comparators 153, 154.

Figure 11:
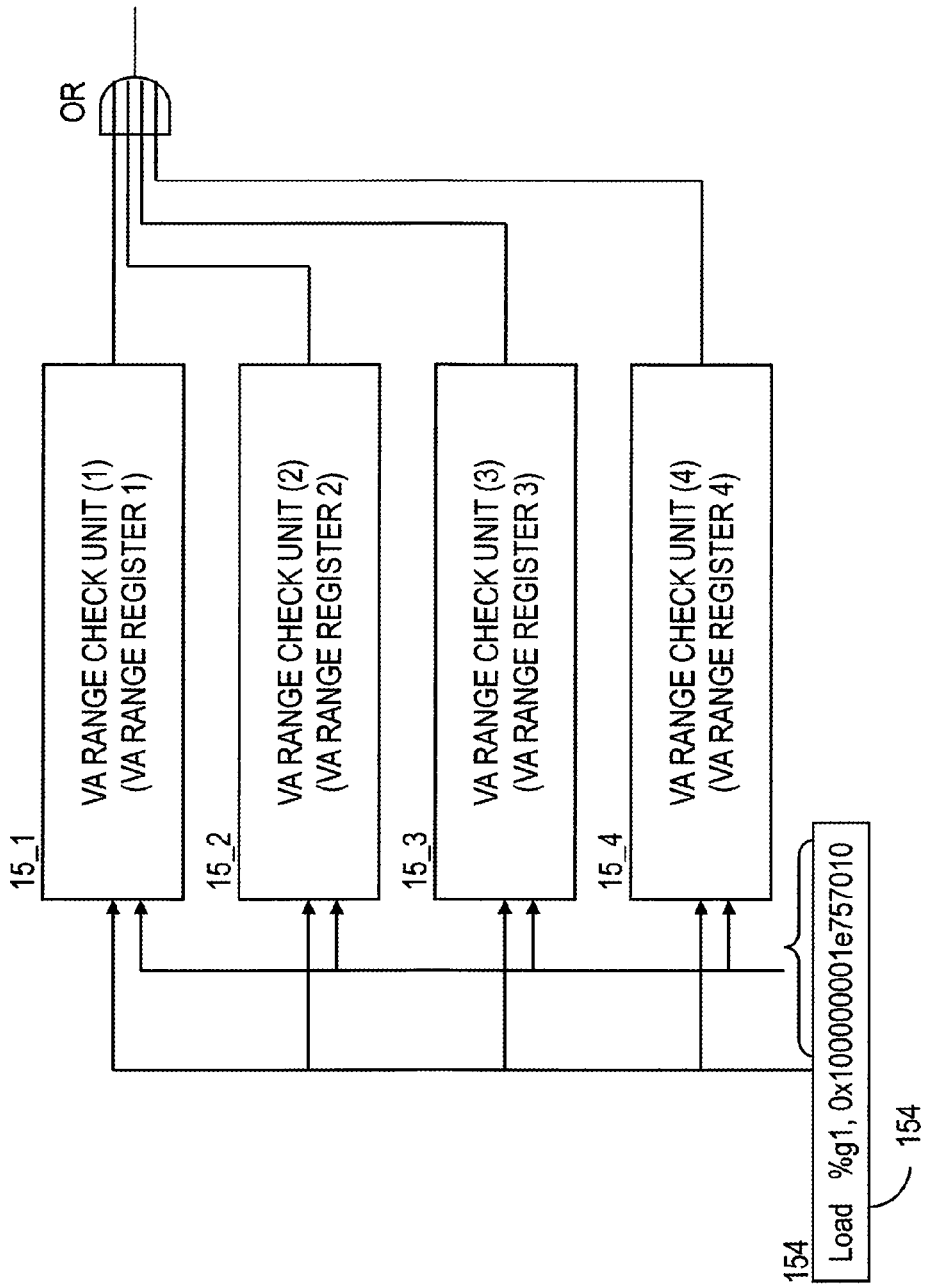
FIG. 11 is a configuration diagram of the address range check unit.

FIG. 11 is a configuration diagram of the address range check unit. The address range check unit shown in FIG. 11 has four sets 15_1 to 15_4 of address range check units 15 shown in FIG. 10. Thus, the address range check units 15_1 to 15_4 each store the address range information of different elements of respective tables in the address range register. The management area identification information ID and virtual address of the load instruction 154 are supplied to the respective address range check units.

Figure 12:
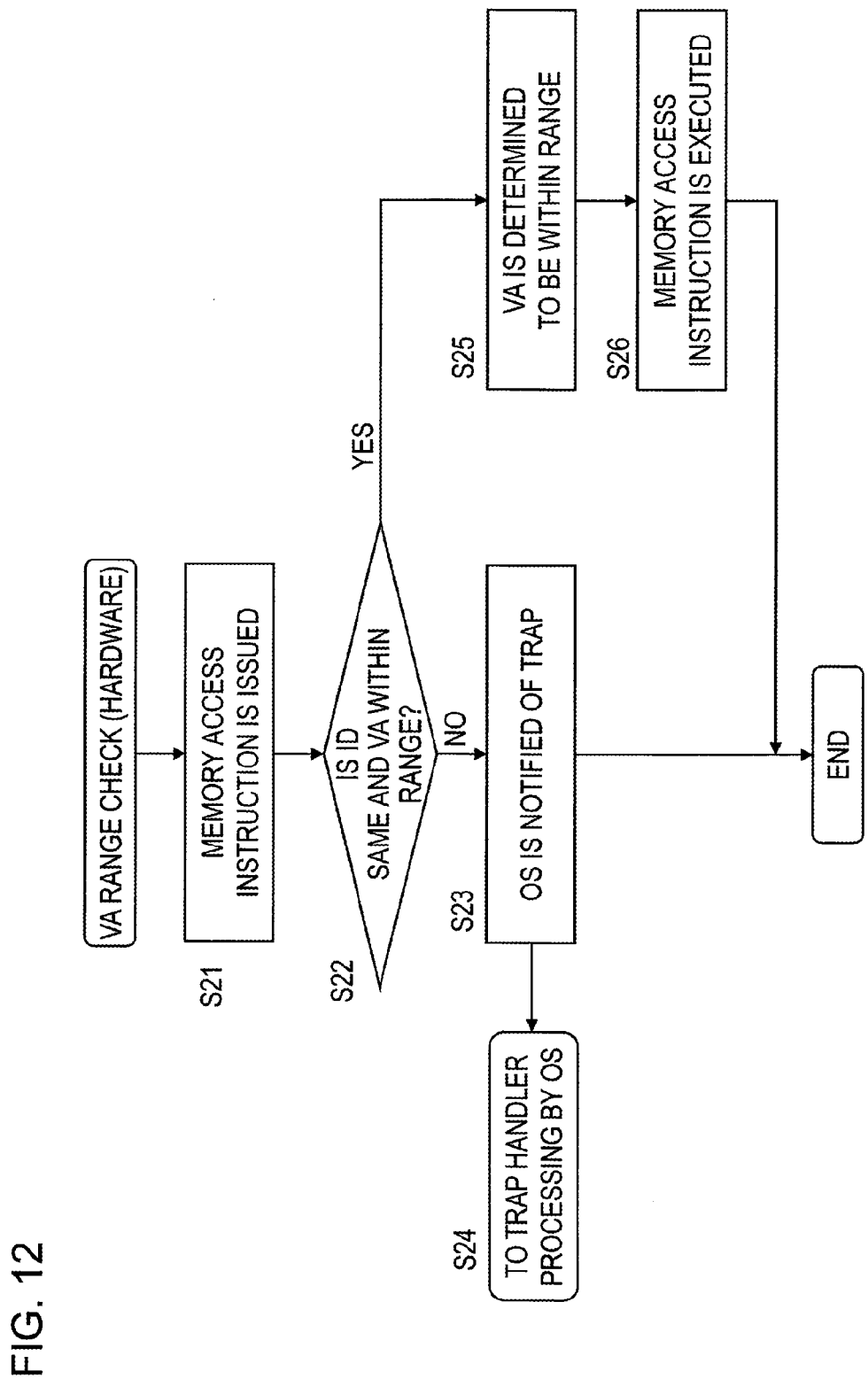
FIG. 12 is a flowchart diagram showing the address range check processing performed by the address range check unit.

FIG. 12 is a flowchart diagram showing the address range check processing performed by the address range check unit. As mentioned hereinabove, the address range check unit is constituted by hardware, and the schematic processing performed thereby is explained with reference to the flowchart.

Where a memory access instruction is issued (S21) in relation to a pointer, into which the start virtual address including the management area identification information ID has been returned from the OS in response to the execution of the memory area allocation function, the memory access instruction holds the virtual address with the embedded management area identification information ID. This is shown in the load instruction in FIG. 10.

In response to the issuance of the memory access instruction, the address range check unit 15 checks whether or not the virtual address (60 bit [59:0] excluding the ID in the example shown in FIG. 11) held by the memory access instruction is within a range of address range information stored in the address range register 15A, and whether or not the management area identification information ID matches (S22). Where the management area identification information ID matches and the virtual address is within the address range (YES in S22), the address range check unit determines that the virtual address accesses the memory allocation area and outputs the address range hit (S25). As a result, the memory access instruction is executed (S26).

Meanwhile, where the virtual address is not in the address range or the management area identification information ID mismatches in the address range check, the address range check unit 15 outputs an address range mishit (NO in S22).

In response to this output, the trap detection circuit 51 shown in FIG. 9 outputs a trap to the instruction sequence control unit 11A, and in response to this output, the trap detection circuit 51 notifies the OS of the trap (S23). As a result, the trap handler of the OS executes the processing relating to the trap (S24).

Figure 13:
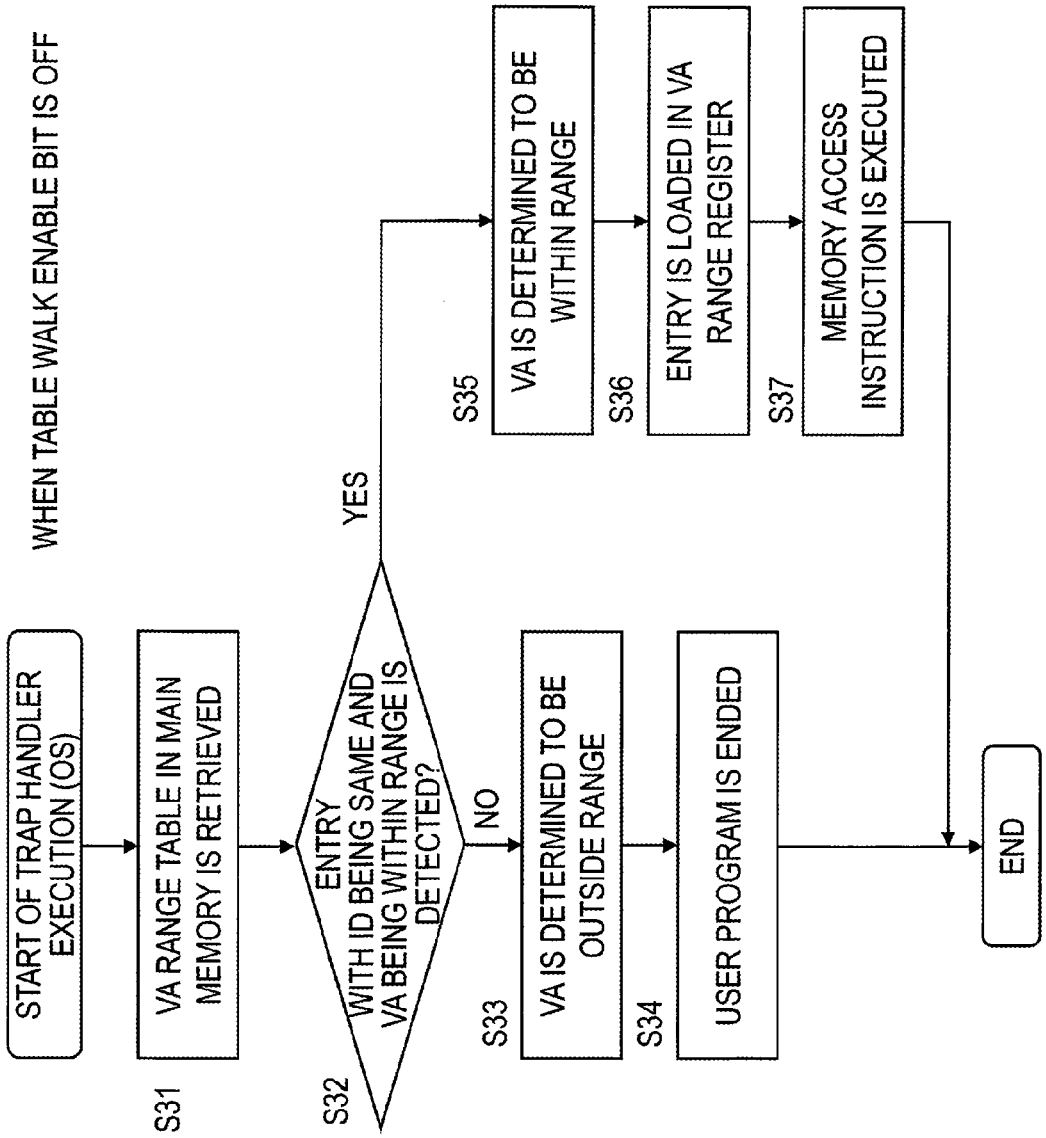
FIG. 13 is a flowchart showing the trap handler processing performed by the OS.

FIG. 13 is a flowchart showing the trap handler processing performed by the OS. This trap handler processing by the OS of FIG. 13 is performed when the below-described table walk enable bit is disabled (OFF).

The address range check unit 15 provided inside the CPU determines whether or not the virtual address of the memory access instruction is within the address range by referring to the address range information of the address range register 35 storing some of the elements of the address range table 34 in the main memory 30. Therefore, where it is determined that the virtual address is not in the address range of any address range register 35, the address range determination should be performed again with reference to the address range information and management area identification information ID of the remaining elements in the address range table 34 in the main memory 30. The processing of the trap handler performed by the OS shown in FIG. 13 is the processing of such redetermination.

The trap handler of the OS searches the address range table 34 in the main memory (S31) and repeatedly checks whether or not the ID matches and whether or not the destination virtual address of the memory access instruction is within the address range, with respect to the address range information and ID of the remaining elements in the table (S32). Where an entry that hits is detected (YES in S32), the OS determines that the virtual address is in the address range (S35) and loads and stores the ID and the address range information of the detected entry in the address range register 15A (S36), by a register set instruction. In this case, when a load and store instruction request is inputted to the L1 cache pipeline and the address range check is executed again, it is detected that the virtual address is within the address range of the address range register and ID watches, and an address range hit is outputted. The memory access instruction is then executed (S37).

Where the newest hit information is stored in the address range register, as in the step S36, the address range check for the memory access instruction relating to the same memory allocation area that will be generated thereafter will be executed by the address range check unit 15 at a high speed. For example, where the memory access instruction relating to a pointer pointer1 with the same FOR statement shown in FIG. 2 is repeated, the address range check unit will rapidly output the address range hit determination by referring to the address range register.

Where no entry that hits is detected in the address range table (S32), the OC determines that the virtual address is outside the address range of the memory allocation area (S33) and ends the user program (S34). As a result, a memory access instruction relating to the outside of the memory allocation area and causing memory corruption is detected and the occurrence of failures caused by memory corruption and bugs is prevented.

Figure 14:
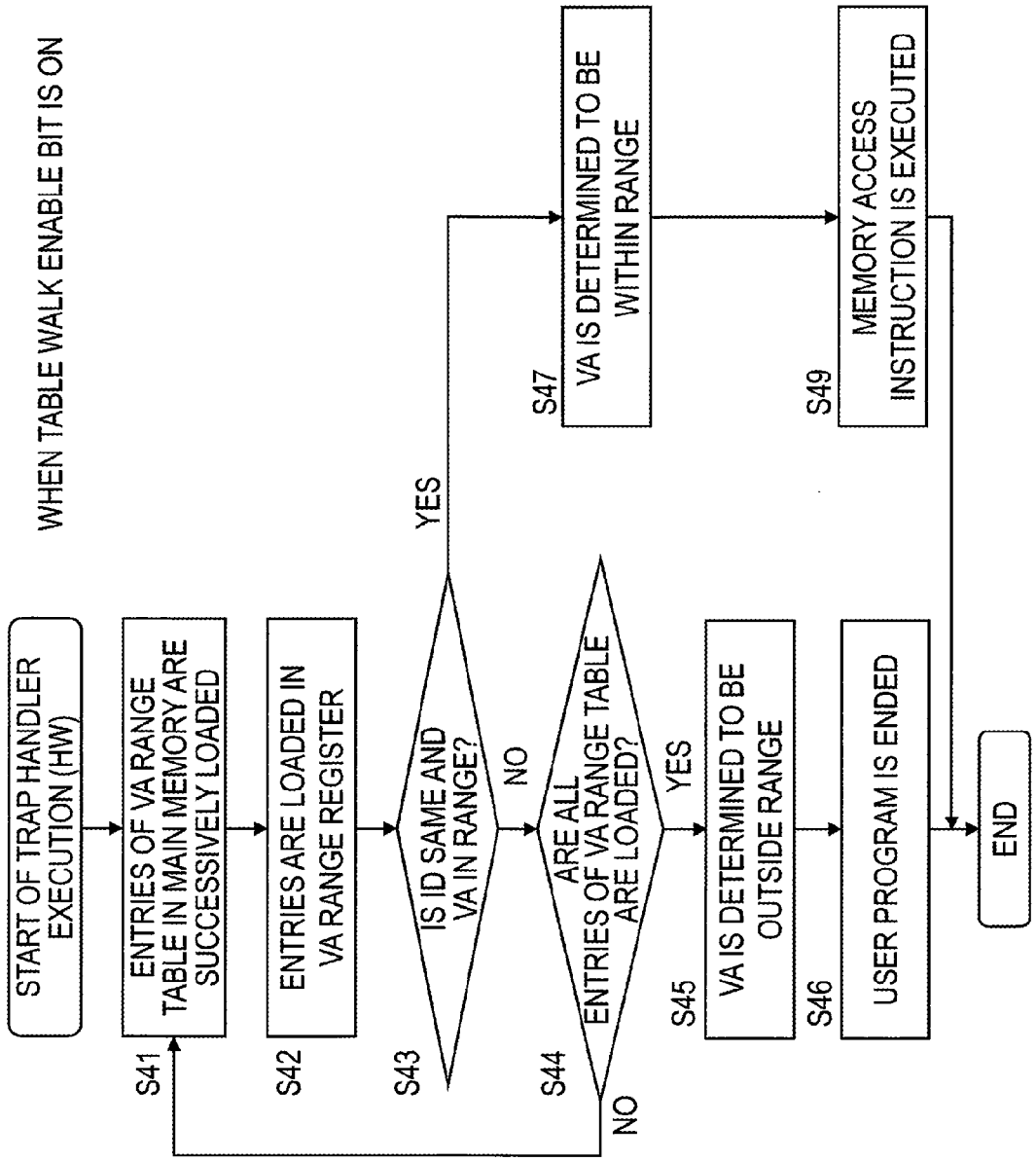
FIG. 14 is a flowchart showing the processing performed by hardware, this processing being similar to that performed by the trap handler.

FIG. 14 is a flowchart showing the processing performed by hardware, this processing being similar to that performed by the trap handler. The processing by the hardware in FIG. 14 is performed when the below-described table walk enable bit is enabled (ON).

The address range check unit 15 in the CPU 10 has a table walk control circuit that sequentially accesses and loads the entries of the address range table 34 in the main memory 30. Such a circuit is shown, for example, in the below-described FIG. 18.

In this case, the address range check unit 15 starts the table walk control circuit, sequentially loads the entries of the address range table in the main memory (S41) and stores the entries in the address range register (S42). Then, the address range check unit 15 executes the address range check on the basis of address range information and management area identification information ID of the entry that have been newly stored in the address range register (S43). Where it is determined in the address range check that the ID matches and the virtual address VA is in the address range (address range hit) (YES in S43), the address range check unit determines that the virtual address is in the address range (S47) and executes the memory access instruction (S49).

In the above-described processing S41 to S43, where the address range hit is not detected, the address walk control circuit repeats the processing till all of the entries of the address range table are loaded to the address range register. Where the address range hit is not detected even when all of the entries are loaded, it is determined that the virtual address is outside the address range (S45), and the user program is ended (S46).

It is not always necessary that the abovementioned management area identification information ID be generated. However, it is preferable that the memory area allocation function and the address range information is associated with each other, so that it is detectable to which memory allocation area reserved by which memory allocation function the memory access instruction relates, and the address range check is executed by comparing the address range information on the memory allocation area with the access destination address of the memory access instruction.

Further, when the management area identification information ID in the access destination virtual address of the memory access instruction is ID=0, it is desirable that the address range check unit determines the address range hit at all times as an address range check exclusion. By using the management area identification information ID in such a manner as information identifying the address range check exclusion, in addition to the information identifying the memory allocation area corresponding to the memory allocation function, it is possible to return ID=0 and make the address range check unnecessary with respect to the memory area allocation function in the process that does not require the address range check.

The specifics of the present embodiment are described below.

[Specifics of the Present Embodiment]

Figure 15:
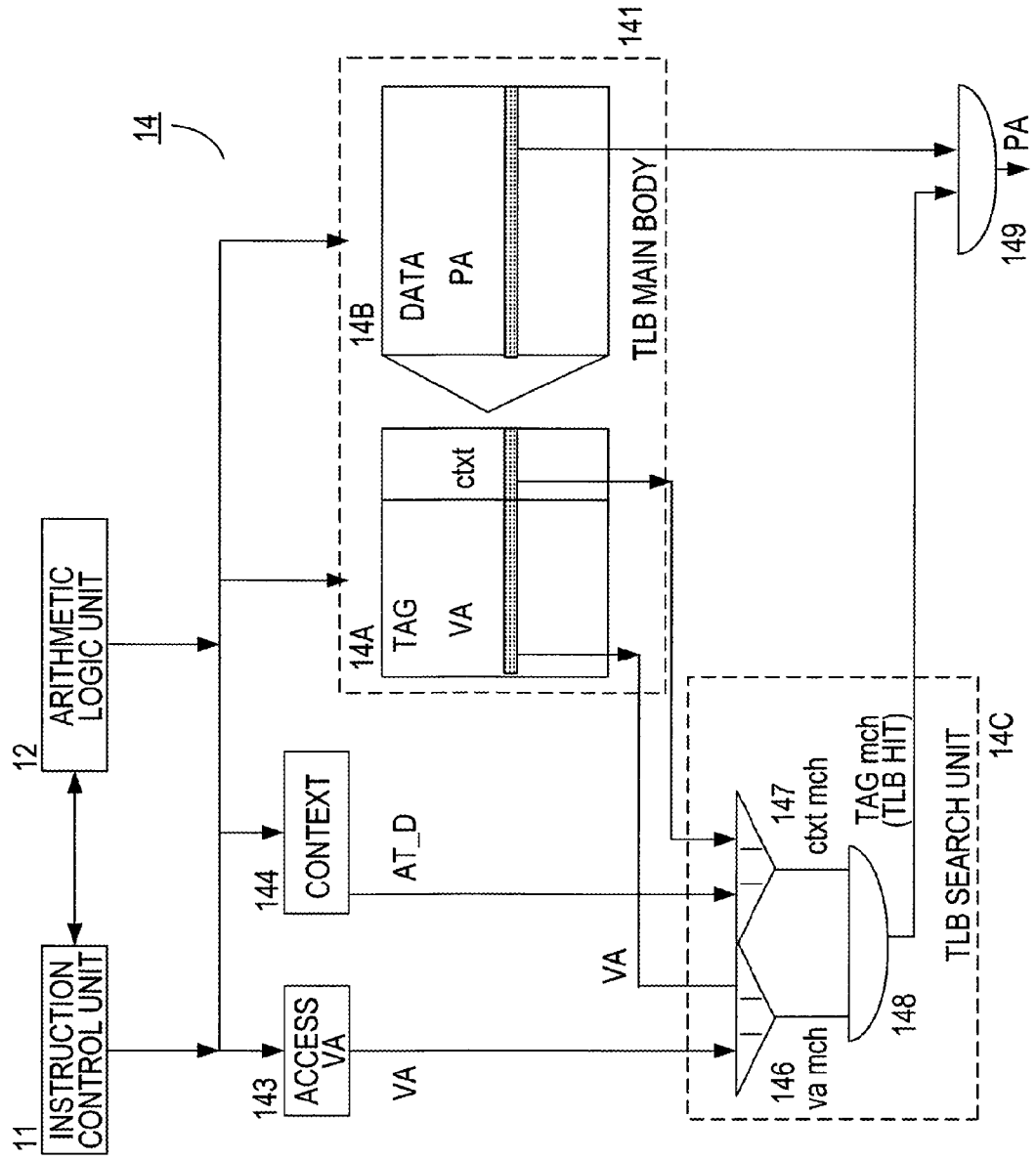
FIG. 15 illustrates the configuration of the TLB unit.

FIG. 15 illustrates the configuration of the TLB unit. The TLB unit 14 has a TLB main body 141 having a tag unit 14A and a data unit 14B of the table look aside buffer (TLB), and a TLB comparison unit 14C. An access destination virtual address VA of the memory access instruction is loaded into an access address register 143 from the instruction control unit 11 or the arithmetic logic unit 12, and attribution data AT_D of the TLB are loaded into a context register 144. Meanwhile, the virtual address VA and the context ctxt, which is the attribution data AT_D of the TLB, are stored in the tag unit 14A of the TLB, and a physical address PA corresponding to the virtual address VA is stored in the data unit 14B of the TLB. Therefore, the physical address in the data unit 14B corresponding to the virtual address VA in the tag unit 14A that matches the access destination virtual address VA of the memory access instruction is outputted as a post-translation address. This TLB comparison is performed in the following manner.

The TLB comparison unit 14C compares the access destination virtual address VA and attribution data AT_D corresponding to the memory access instruction loaded into the access address register 143 and the context register 144 with the virtual address VA and contents ctxt that have been stored in the tag unit 14A. The TLB comparison unit 14C has a comparator 146 that compares the access destination virtual address VA in the access address register 143 with the virtual address in the tag unit 14A and outputs a virtual address match output va_mch when the virtual addresses match, a comparator 147 that compares the attribution data AT_D in the context register 144 with the contents ctxt in the tag unit 14A and outputs a context match output ctxt_mch when the data match, and an AND gate 148 that computes AND of the outputs of the two comparators.

The physical address PA of the data unit 14B at the time both comparators 146, 147 detect matching is outputted via the AND gate 149 as the physical address PA after address translation, while successively searching the tag unit 14A.

When the tags mismatch in a plurality of elements in the TLB, an entry is fetched from the address translation table 33 in the main memory 30 and registered in the TLB 141. When the elements of the TLB are updated, the instruction control unit 11 outputs a TLB registration request and the updated data (VA, AT_D and PA) of the TLB entry to the TLB unit 14. As a result, the TLB elements are updated and the TLB look-up is further performed.

It is not always necessary to perform the above-described context comparison, and a configuration in which a corresponding physical address is outputted when the access destination virtual address and the virtual address in the tag unit 14A match may be also used.

Figure 16:
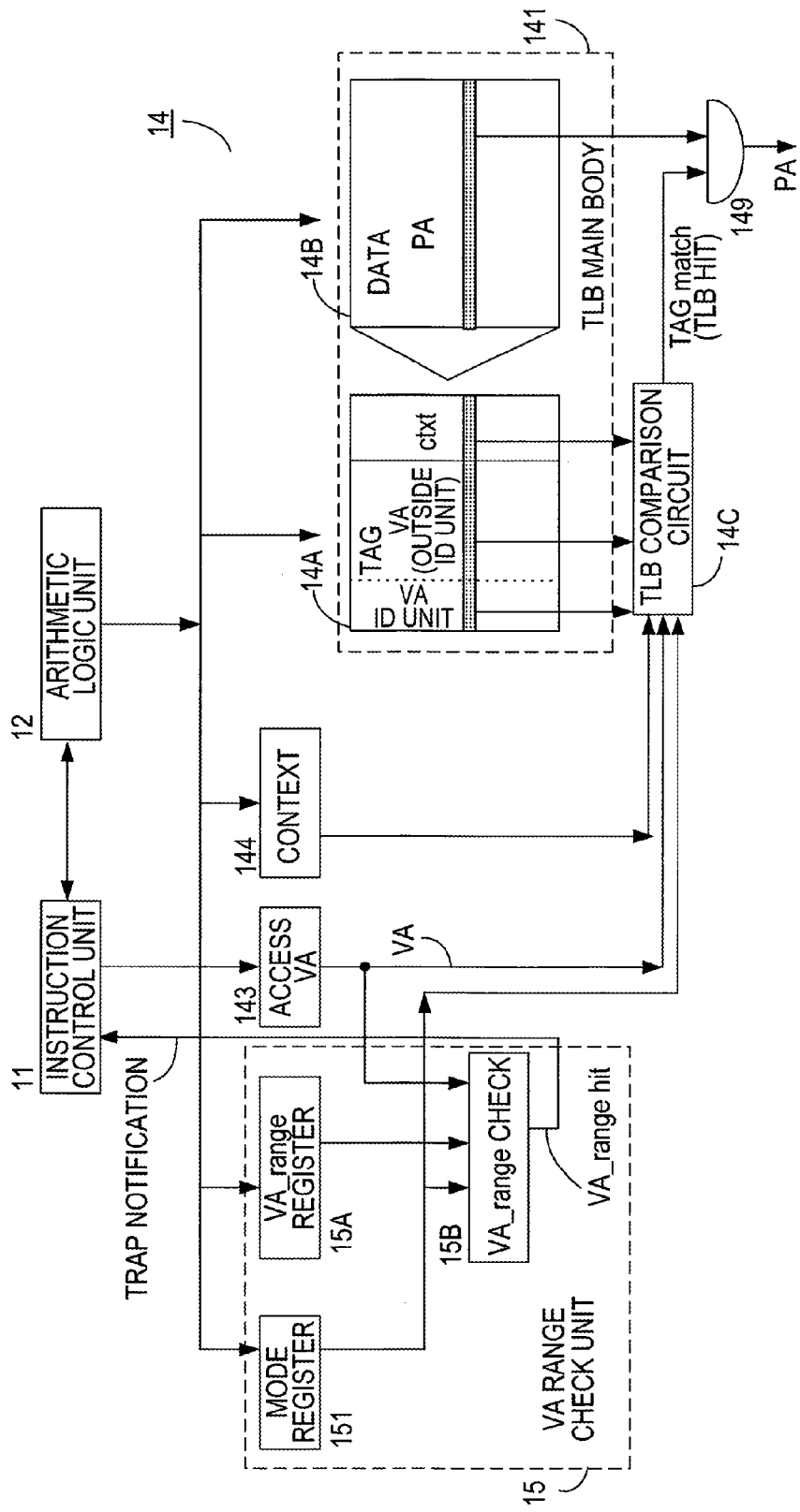
FIG. 16 illustrates the configuration of the address range check unit and TLB unit in the present embodiment.

FIG. 16 illustrates the configuration of the address range check unit and TLB unit in the present embodiment. The address range check unit 15 is configured to perform operations parallel to the TLB unit 14, without changing the circuit configuration of the TLB unit 14 shown in FIG. 15. Such parallel operation of the two units is explained with the primary cache pipeline shown in FIG. 9.

The TLB unit 14 in FIG. 16 is configured in the same manner as in FIG. 15. Meanwhile, the address range check unit 15 has an address range register 15A, a mode register 151, and an address range check circuit 15B. The address range register 15A is a register that caches the address range information on some elements in the address range table 34 in the main memory 30 into the primary cache. The address range check is accelerated by providing the address range register 15A in the primary cache.

The mode register 151 is configured, for example, by 2 bits. The bit0 of the mode register is an address range check circuit enable bit. Where the bit is enabled (bit0=1), the operation of the address range check circuit is enabled, and where the bit is disabled (bit1=0), the operation is disabled. The bit1 of the mode register is a table walk by hardware enable bit. This bit sets a method for accessing the address range table in the main memory when the address range check determines an address range mishit (outside the address). When the bit is enabled (bit1=1), the elements of the address range table in the main memory are successively read using the table walk circuit configured by hardware, and when the bit is disabled (bit1=0), the trap handler of the OS performs the same table walk processing.

The address range check circuit 15B checks whether or not the virtual address VA of the memory access instruction to be loaded into the access address register 143 is within the address range in the address range register 15A. This check is similar to that explained with reference to FIG. 11. When the virtual address VA of the memory access instruction is within the address range of the address range register, the address range check circuit 15B outputs an address range hit, and when the virtual address VA is outside the address range, an address range mishit is outputted. The instruction control unit 11 is then trap-notified by the address mishit output through the trap detection circuit 51 shown in FIG. 9.

With the present embodiment, the address range check unit 15 performs the matching processing as to whether the virtual address is in the address range with respect to the virtual address of the memory access instruction in parallel with the address translation processing in which the TLB unit 14 performs tag matching with reference to the TLB main body 141. Therefore, it is possible to configure the address range check unit 15, without significant changes in the circuit operation relating to the memory access instruction. As a result, the overhead caused by the address range check processing can be reduced.

Figure 17:
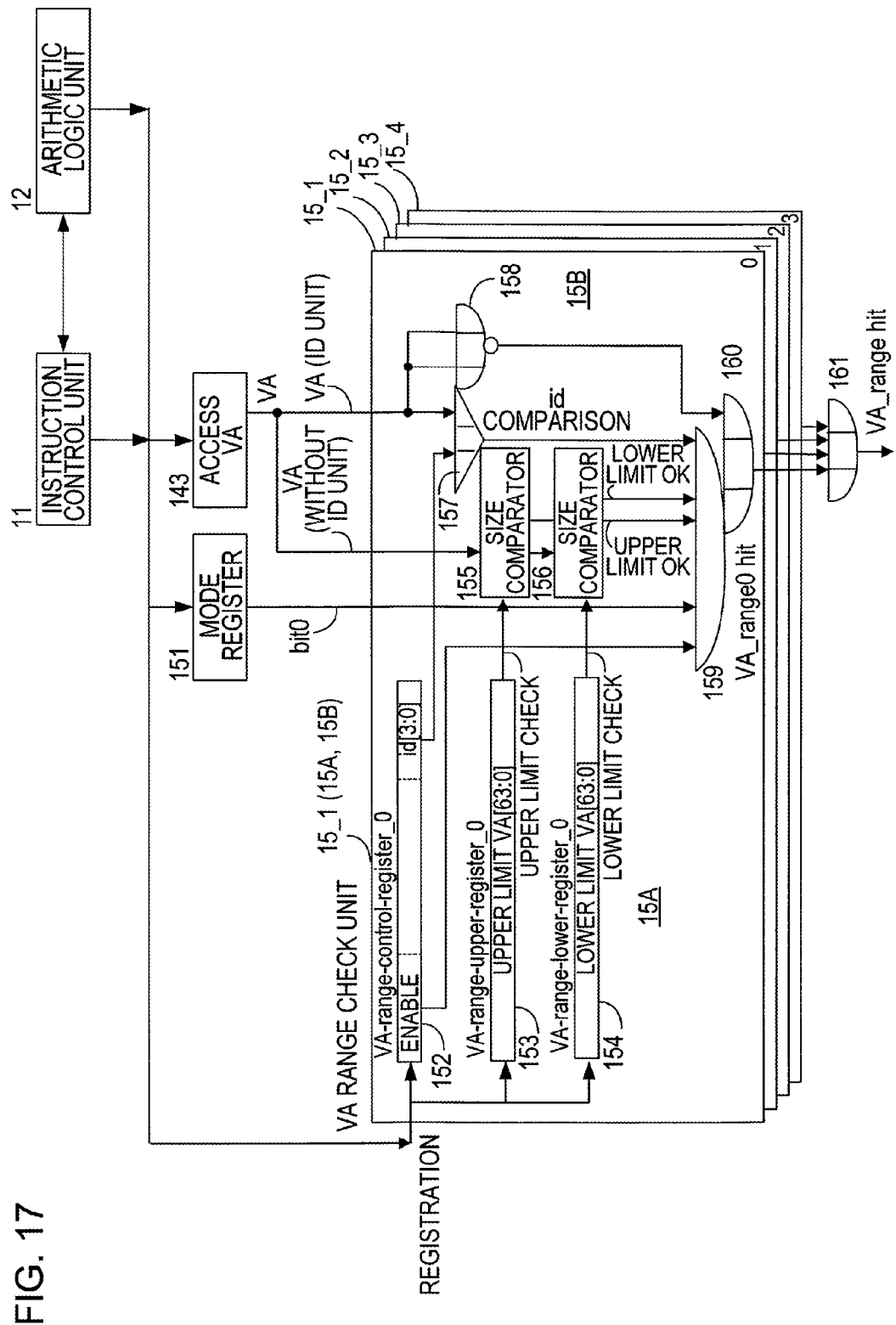
FIG. 17 illustrates the configuration of the address range check unit in the present embodiment.

FIG. 17 illustrates the configuration of the address range check unit in the present embodiment. In the example shown in FIG. 17, there are four address range check units 15_1 to 15_4 inside the primary cache pipeline 50, and the outputs of those address range check units indicating whether the address range hit (VA range 0 hit) is obtained are outputted through an OR gate 161. The address range check units 15_1 to 15_4 each have the address range register 15A and the address range check circuit 15B.

The address range register 15A has three registers 152, 153, 154. The address range lower register 154 stores the start address VA (64 bits) of the memory allocation area, and the address range upper register 153 stores the end address VA (64 bits). The address range control register 152 stores an enable flag indicating whether or not the value of the address range register is enable in the bit [63] and stores the management area identification information ID in the bit [3:0].

As shown in the format F1 in FIG. 6, the management area identification information ID [63:60] is embedded in the most significant 4 bits of the virtual address. Therefore, the ID [63:60] and the virtual address [59:0] are stored also in the lower register 154 and the upper register 153, in the same manner as in the configuration shown in FIG. 10. Incidentally, this virtual address [59:0] and the virtual address [59:0] excluding the most significant 4 bits [63:60] in the access address register 143 are compared in the size comparators 155, 156.

When the context register in the CPU is updated, for example, during process switching in the user program, the OS executes the register set instruction and all of the enable flags of the address range control registers 152 of the four sets are cleared. As a result, in this process, new elements are cached from the address range table 34 into the ID [3:0] of the register 152 and the registers 153, 154. Further, the enable flag of the bit0 in the mode register 151 is set by a register set instruction. As a result, it is possible to set the address range check mechanism to the enabled or disabled state for each process.

The request in which the management area identification ID [3:0] is embedded in the most significant 4 bits [63:60] of the virtual address VA [63:0] of the memory access instruction, such as load and store instructions, is inputted from the instruction control unit 11 or arithmetic logic unit 12 into the primary cache pipeline 50. The primary cache pipeline 50 performs the address range check in parallel with the TLB retrieval. The address range check is performed in the following manner.

The address range check circuit 15B has the first size comparator 155 that performs size comparison of the address [59:0] other than the ID of the virtual address of the memory access instruction and the end virtual address [59:0] in the address range upper register 153, the second size comparator 156 that performs size comparison with the start virtual address [59:0] in the address range lower register 154, a comparator 157 that compares the ID [63:60] of the virtual address of the memory access instruction with the management area identification information ID [3:0] in the control register 152, and an AND gate 159 that computes a logical sum of the outputs of the comparators 155, 156, 157, the address range check enable flag of bit0 of the mode register 151, and the address range register enable flag of the control register 152.

Therefore, when the virtual address VA [59:0] excluding the ID [63:60] of the access address register 143 is between the start virtual address [59:0] and end address [59:0] of the registers 153, 154 where the address range check enable flag and the address range register enable flag are both enable, the AND gate 159 outputs an address range hit (1).

Where the address range check enable flag of the mode register 151 is disable (0), the AND gate 159 outputs an address range mishit (0). Therefore, by setting the enable flag of the mode register 151 from the user software, it is possible to enable or disable the address range check mechanism.

Further, where the embedding of ID=0 (4 bit=0000) as the management area identification information ID, which indicates the exclusion of the address range check object, in the virtual address is implemented, the address range check circuit 15B has a NOR gate 158 detecting whether or not all of the 4 bits [63:60] of the ID in the access address register 143 are 0. When ID=0000, the NOR gate 158 outputs "1", and the address range hit is outputted through the OR gate 160. As a result, when the management area identification information ID is ID=0000, the OR gate 160 outputs the address range hit (1), regardless of the determination as to whether or not the virtual address [59:0] is within the address range. As a result, the erroneous output of an address range mishit and the erroneous issuance of a trap is avoided when outside of the address range check management area.

Where an address range hit is determined for any of the address range check units 15_1 to 15_4 of the four sets, an address range hit is outputted from the OR gate 161, and where an address range mishit is determined for all of the address range check circuits, an address range mishit (outside address range in the address range register) is outputted from the OR gate 161.

The address range register 15A in FIG. 17 is configured, as shown in FIG. 10, by a register storing a start address, a register storing an address range (range), and a control register shown in FIG. 17. In this case, it is preferred that the configuration be provided with an adder that computes an end address obtained by adding the address range to the start address when loading the start address and the address range into each register, and an end register storing the addition result obtained in the adder.

In FIG. 14, the case is explained in which when the address range check unit 15 outputs an address range mishit on the basis of the address range registers 15A (152 to 154), a table walk circuit based on hardware is used, the elements of the address range table in the main memory are registered in the address rage register, and the address range check is performed. This is the processing of the trap handler performed by hardware.

Figure 18:
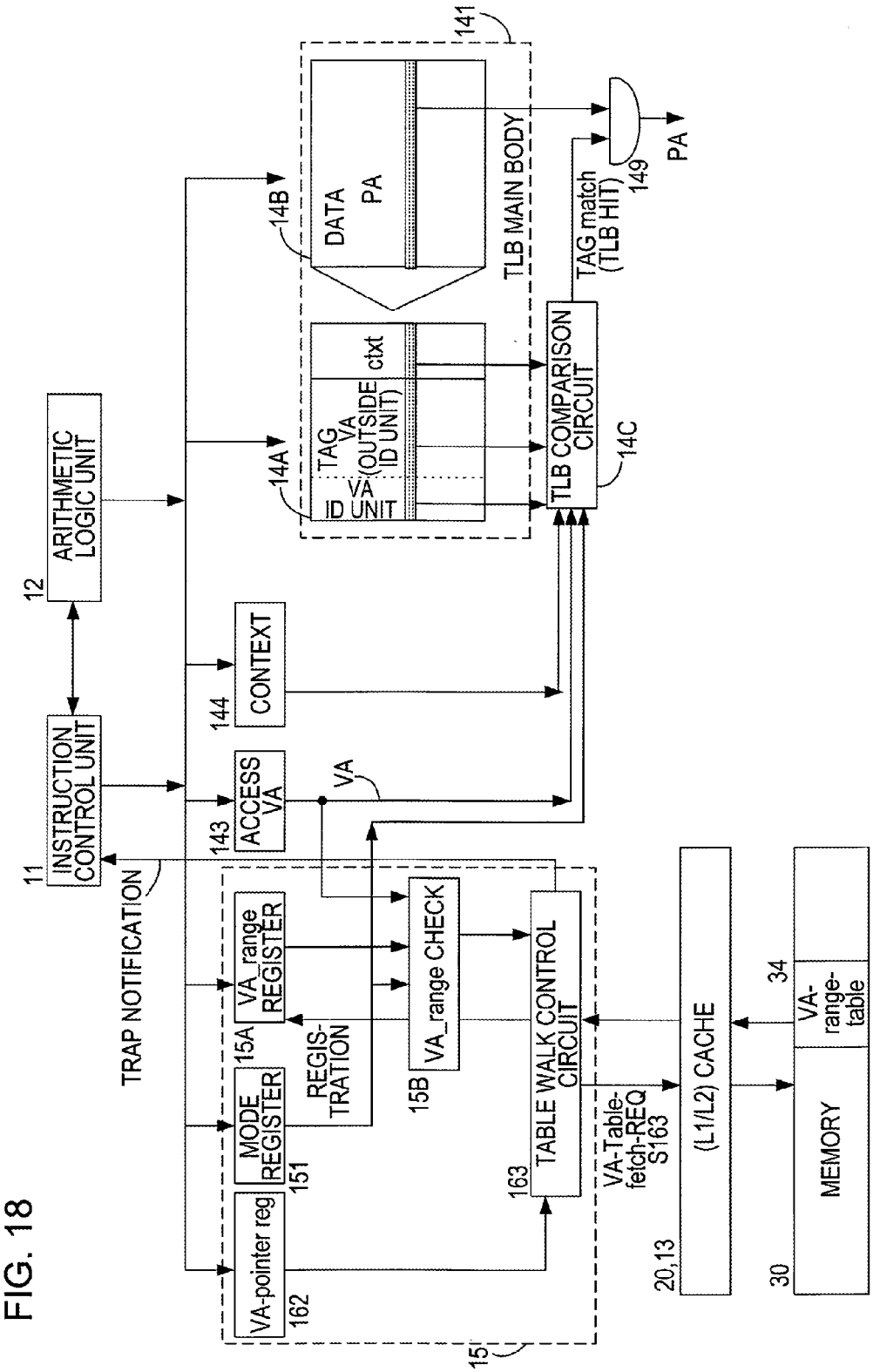
FIG. 18 illustrates the configuration of the address range check unit 15 in the case where the trap handler processing is performed by hardware.

FIG. 18 illustrates the configuration of the address range check unit 15 in the case where the trap handler processing is performed by hardware. When bit1=1 of the mode register 151, the table walk enable flag is ON, and where the output of the address range check circuit 15B is an address range mishit, the table walk control circuit 163 operates.

The table walk control circuit 163 issues an address range table check request S163 on the basis of the start address of the address range table 34 in the main memory that has been set in the address pointer register 162, and activates the primary and secondary L1, L2 caches 20, 13 to fetch the four elements in the address range table 34 in the main memory 30. The L1, L2 caches 20, 13 read the four elements in the address range table 34 and load the elements into the address range register 15A in the same manner as with the usual load instruction. Then, the request of a load and store instruction is again loaded into the L1 cache pipeline and the address range check is executed by the address range check unit 15.

In the case of an address range mishit, the table walk control circuit 163 repeats the above-described processing with respect to all of the elements in the address range table. Where the address range mishit is obtained for all of the elements, the address range mishit is determined. In this case, the table walk control circuit 163 performs trap notification to the instruction control unit 11.

Figure 19:
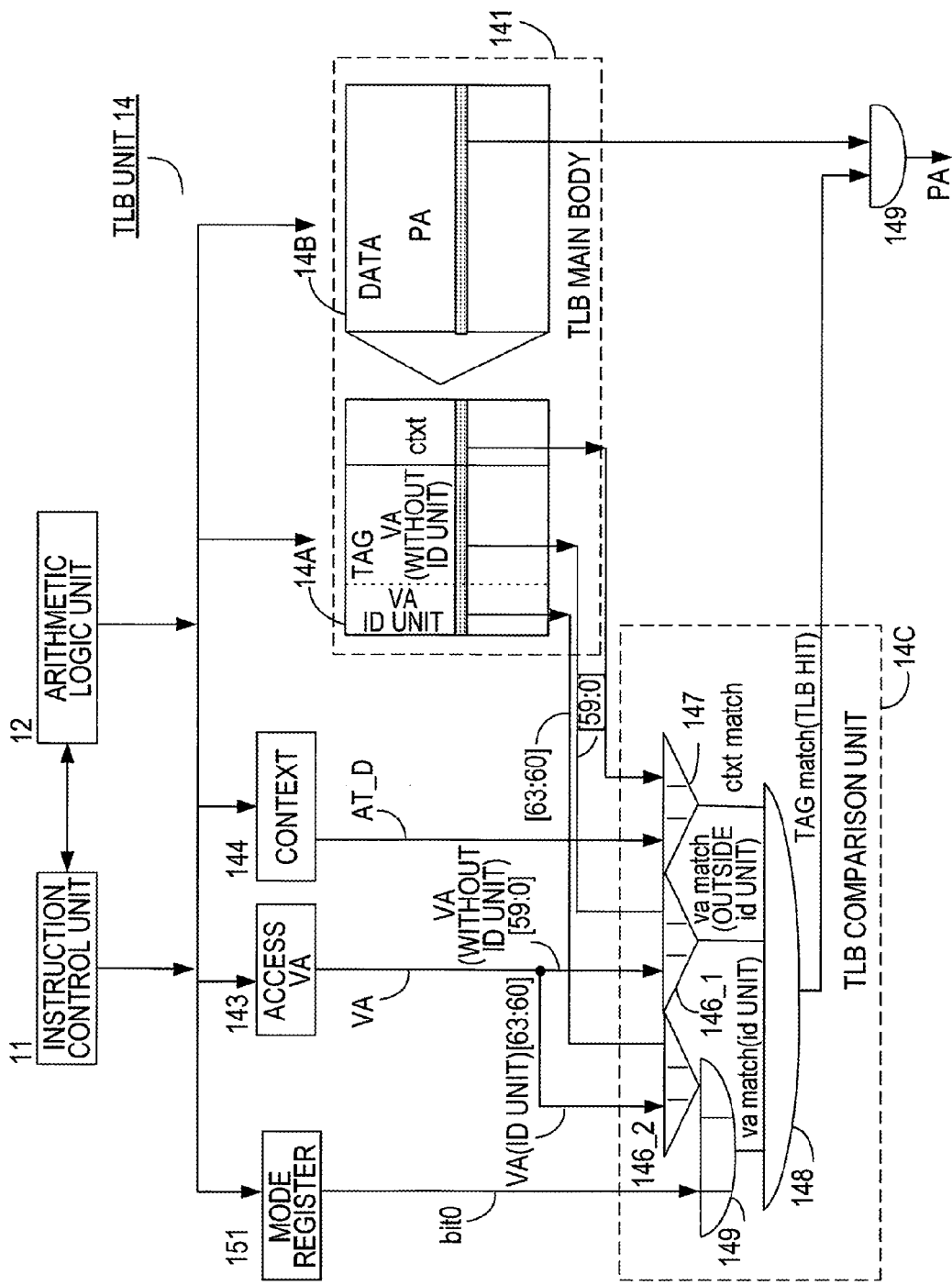
FIG. 19 illustrates the configuration of the TLB unit in the present embodiment.

FIG. 19 illustrates the configuration of the TLB unit in the present embodiment. As explained with reference to FIG. 6, in the present embodiment, where the address range check mechanism is enabled, the management area identification ID is embedded in the most significant 4 bits [63:60] of the virtual address VA [63:0], and a plurality of memory allocation areas is identified as the management object area of address range check. Meanwhile, where the address range check mechanism is disabled, the management area identification ID [63:60] is not embedded in the virtual address VA [63:0]. Thus, 64 bits [63:0] of the already present virtual address VA are effectively used and the address range check is performed practically without changes in the circuitry.

As a result, when bit0 of the mode register 151 is bit0=1, the virtual address format returned by the OS in response to the system call by the memory area allocation function becomes ID[63:60]VA[59:0], and the virtual address ID[63:60], VA[59:0] is stored in the TAG unit 14A of the TLB. Meanwhile, the virtual address requiring the address translation would be outside the memory area allocated by the memory area allocation function. In such a case, the ID[63:60]VA[59:0] and VA[63:0] are mixed in the TAG unit 14A of the TLB. Accordingly, when bi0=1 of the mode register 151, the matching result of the ID[63:60] should be ignored.

Therefore, in the TLB unit 14, the information of the most significant 4 bits [63:60] in the 64-bit virtual address VA differs between the case in which the address range check mechanism is enabled (in the mode register 151, bit0=1) and the case in which it is disabled (in the mode register 151, bit0=0). Therefore, the operation of the TLB unit 14 should be switched. In other words, when the mechanism is enabled (bit0=1), the most significant 4 bits [63:60] of the virtual address VA are enabled as the ID and are not considered as part of the virtual address VA. Therefore, in the TLB determination performed by the TLB unit, the comparison result of the most significant 4 bits is ignored. When the mechanism is disabled (bit0=0), the most significant 4 bits [63:60] are enabled as part of the virtual address VA, and in the TLB determination, the comparison result of the most significant 4 bits [63:60] is reflected in the TLB determination.

The TLB comparison unit 14C of the TLB unit 14 shown in FIG. 19 is divided into a comparator 146_1 comparing information [59:0] other than the ID portion [63:60] of the virtual address VA and a comparator 146_2 comparing the ID portion [63:60]. The TLB comparison unit 14C also has an OR gate 149 computing a logical sum of the output of the comparator 146_2 of the ID portion [63:60] and the bit0 of the mode register 151, and the outputs of the comparators 147, 146_1 and the OR gate 149 are inputted to the AND gate 148.

The operation of the TLB comparison unit 14C is described below.

(1) The case in which the address range check enable flag is enable (bit0=1)

The most significant 4 bits [63:60] of the virtual address VA are enabled as the ID and are not considered as part of the virtual address VA. Therefore, the TLB comparison unit 14C outputs through the OR gate 149 a match output (1) indicating matching at all times due to the enable flag (bit0=1), and the comparison result of the comparator 146_2 relating to the ID of the most significant 4 bits [63:60] of the virtual address VA is ignored. As a result, even when the output of the comparator 146_2 is a mismatch, where the outputs of the comparators 147 and 146_1 both match (1), the match of tag portions, that is, the TLB hit, is outputted from the AND gate 148.

(2) The case in which the address range check enable flag is disable (bit0=0)

The most significant 4 bits [63:60] of the virtual address VA are disabled as the ID and should be considered as part of the virtual address VA. Therefore, the TLB comparison unit 14C directly outputs from the OR gate 149 the output of the comparator 146_2 with the enable flag (bit0=0), and the comparison result of the comparator 146_2 relating to the ID of the most significant 4 bits of the virtual address VA is reflected in the TLB match. As a result, when all of the outputs of the comparators 147, 146_1, and 146_2 match, the match of tag portions, that is, the TLB hit, is outputted from the AND gate 148.

As explained hereinabove, with the address range check mechanism of the present embodiment, when a memory access instruction corresponding to the memory allocation area reserved by a memory area allocation function is executed, it is possible to determine whether or not the access destination address of the memory access instruction is within the address range of the memory allocation area.

In particular, in the present embodiment, by adding the address range table and the address range check unit, address range check is performed during the execution of the memory access instruction.

Furthermore, in the present embodiment, by providing the address range check unit in parallel with the TLB unit, the address range check in parallel with the TLB determination is performed when the memory access instruction is executed, and the overhead of the address range check processing is small.

Further, in the present embodiment, the address range table is stored in the main memory, and some elements of the address range table are cached in the address range register of the address range check unit in the primary cache pipeline, thereby the address range check determination is accelerated.

Further, in the present embodiment, in response to a system call from the memory area allocation function, the OS embeds the management area identification information ID identifying the memory allocation area as the management area of the address range check in the most significant bits of the start virtual address and returns it as an argument to the function. As a result, the address range check is performed by distinguishing the memory allocation areas of a plurality of management objects. By using ID=0 indicating that the address range check is unnecessary in the management area identification information ID, an unnecessary trap is avoided with respect to a memory allocation area for which the address range check management is not required. Further, the management area identification ID is also used for distinguishing the address range check objects from non-objects for each process.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An arithmetic processing device comprising:
an allocation unit configured to reserve a memory allocation area in a memory and register address range information indicating an address range of the memory allocation area and management area identification information identifying a memory area allocation function in an address range table, in response to an execution of the memory area allocation function requesting memory area allocation;
a determination unit configured to refer to the address range table and perform determination processing as to whether or not an access destination address of a memory access instruction is within an address range indicated by the address range information that is registered in the address range table and that corresponds to the management area identification information of the memory access instruction, in response to an execution of the memory access instruction;
the allocation unit configured to register any management area identification information amongst a first management area identification information group, together with the address range information, in the address range table, in response to the execution of the memory area allocation function that requires an address range check, and configured to register second management area identification information that is distinguished from the first management area identification information group, together with the address range information, in the address range table, in response to the execution of the memory area allocation function that does not require the address range check; and
the determination unit does not determine that the access destination address is outside the address range, regardless of the determination as to whether or not the access destination address is within the address range indicating the address range information registered in the address range table, when the management area identification information held by the memory access instruction is the second management area identifica- tion information, in response to the execution of the memory access instruction.

2. The arithmetic processing device according to claim 1, further comprising:
an address translation unit configured to, in response to an execution of a memory access instruction, refer to an address translation reference table, which translates an access destination address of the memory access instruction into a physical address, and output a physical address corresponding to the access destination address, wherein the determination unit and the address translation unit are provided at the same pipeline stage; and the address translation unit is configured to refer to the address translation reference table while ignoring the management area identification information in the access destination address when an address range check mechanism is set to be operable, and refer to the address translation reference table, without ignoring the management area identification information in the access destination address, when the address range check mechanism is set to be inoperable.

3. An arithmetic processing device comprising:
an allocation unit configured to reserve a memory allocation area in a memory and register address range information indicating an address range of the memory allocation area in an address range table, in response to an execution of a memory area allocation function requesting memory area allocation;

a determination unit configured to refer to the address range table and perform determination processing as to whether or not an access destination address of a memory access instruction is within an address range indicated by the address range information registered in the address range table, in response to an execution of the memory access instruction; and an address translation unit configured to, in response to the execution of the memory access instruction, refer to an address translation reference table, which translates an access destination address of the memory access instruction into a physical address, and output a physical address corresponding to the access destination address, wherein the determination unit and the address translation unit are provided at the same pipeline stage.

4. An arithmetic processing device comprising:
an allocation unit configured to reserve a memory allocation area in a memory and register address range information indicating an address range of the memory allocation area in an address range table, in response to an execution of a memory area allocation function requesting memory area allocation;

a determination unit configured to refer to the address range table and perform determination processing as to whether or not an access destination address of a memory access instruction is within an address range indicated by the address range information registered in the address range table, in response to an execution of the memory access instruction; and a cache configured to have a cache memory and a cache pipeline, wherein the address range table is stored in the memory;

the determination unit includes an address range register which is provided in the cache pipeline and in which address range information on a predetermined number of elements in the address range table is registered, and the determination processing includes a first determination performed with reference to the address range register, and a second determination performed with reference to the address range table when the access destination address is determined not to be within an address range indicated by address range information registered in the address range register, in the first determination.

5. The arithmetic processing device according to claim 4, wherein the determination unit is configured to cause an operation system to execute the second determination.

6. The arithmetic processing device according to claim 4, wherein the determination unit includes a table walk circuit, which successively reads address range information on elements in the address range table and registers the read address range information in the address range register, and configured to execute the second determination on the basis of address range information registered in the address range register.

7. The arithmetic processing device according to claim 4, wherein
an address range table is reserved for each context and when switching of the context is generated, the content of the address range register before the switching is saved in the memory and the content of the address range table after the switching is restored from the memory.

8. A control method of an information processing device comprising:
reserving a memory allocation area in a memory and registering address range information indicating an address range of the memory allocation area and management area identification information identifying a memory area allocation function in an address range table, in response to an execution of the memory area allocation function requesting memory area allocation;

referring to the address range table and performing determination processing as to whether or not an access destination address of a memory access instruction is within an address range indicated by the address range information that is registered in the address range table and that corresponds to the management area identification information of the memory access instruction, in response to an execution of the memory access instruction;

registering any management area identification information amongst a first management area identification information group, together with the address range information, in the address range table, in response to the execution of the memory area allocation function that requires an address range check, and configured to register second management area identification information that is distinguished from the first management area identification information group, together with the address range information, in the address range table, in response to the execution of the memory area allocation function that does not require the address range check; and determining not that the access destination address is outside the address range, regardless of the determination as to whether or not the access destination address is within the address range indicating the address range information registered in the address range table, when the management area identification information held by the memory access instruction is the second management area identification information, in response to the execution of the memory access instruction.

9. A non-transitory computer readable storage medium storing a control program for an information processing device causing a computer to perform a process comprising:

reserving a memory allocation area in a memory and registering address range information indicating an address range of the memory allocation area and management area identification information identifying a memory area allocation function in an address range table, in response to an execution of the memory area allocation function requesting memory area allocation;

referring to the address range table and preforming determination processing as to whether or not an access destination address of a memory access instruction is within an address range indicated by the address range information that is registered in the address range table and that corresponds to the management area identification information of the memory access instruction, inresponse to an execution of the memory access instruction;

registering any management area identification information amongst a first management area identification information group, together with the address range information, in the address range table, in response to the execution of the memory area allocation function that requires an address range check, and configured to register second management area identification information that is distinguished from the first management area identification information group, together with the address range information, in the address range table, in response to the execution of the memory area allocation function that does not require the address range check; and determining not that the access destination address is outside the address range, regardless of the determination as to whether or not the access destination address is within the address range indicating the address range information registered in the address range table, when the management area identification information held by the memory access instruction is the second management area identification information, in response to the execution of the memory access instruction.

* * * * *